US012567096B2

(12) United States Patent
Sicconi et al.

(10) Patent No.: US 12,567,096 B2
(45) Date of Patent: Mar. 3, 2026

(54) SYSTEMS AND METHODS FOR USING ARTIFICIAL INTELLIGENCE TO PRESENT GEOGRAPHICALLY RELEVANT USER-SPECIFIC RECOMMENDATIONS BASED ON USER ATTENTIVENESS

(71) Applicant: TeleLingo DBA dreyev, Purdys, NY (US)

(72) Inventors: Roberto Sicconi, Purdys, NY (US); Malgorzata Stys, Purdys, NY (US)

( * ) Notice: Subject to any disclaimer, the term of this patent is extended or adjusted under 35 U.S.C. 154(b) by 317 days.

(21) Appl. No.: 17/992,694

(22) Filed: Nov. 22, 2022

(65) Prior Publication Data

US 2023/0112797 A1 Apr. 13, 2023

Related U.S. Application Data

(63) Continuation-in-part of application No. 16/589,241, filed on Oct. 1, 2019, now Pat. No. 11,507,857.

(51) Int. Cl.
| | |
|---|---|
| *G06Q 30/06* | (2023.01) |
| *G06Q 30/0601* | (2023.01) |
| *G07C 5/02* | (2006.01) |

(52) U.S. Cl.
CPC ........... *G06Q 30/0631* (2013.01); *G07C 5/02* (2013.01)

(58) Field of Classification Search
CPC ........... G06N 5/04; G06N 20/00; G06N 3/08; G06K 9/00791; G06K 9/00228; G06K 9/48; G06K 9/00845; B60Q 9/00; B60R 11/04; B60W 2540/229; B60W 50/14
See application file for complete search history.

(56) References Cited

U.S. PATENT DOCUMENTS

| | | | |
|---|---|---|---|
| 8,489,326 B1 | 7/2013 | Na et al. | |
| 2002/0091568 A1 | 7/2002 | Kraft et al. | |
| 2006/0267781 A1* | 11/2006 | Coulter | G01C 21/3679 |
| | | | 340/573.7 |

(Continued)

OTHER PUBLICATIONS

The Bidding Traveler Helps You Get the Best Hotel Prices With Priceline; Dachis, Adam, Lifehacker; Jan. 7, 2011; https://lifehacker.com/the-bidding-traveler-helps-you-get-the-best-hotel-price-5726394.

*Primary Examiner* — Zhitong Chen
(74) *Attorney, Agent, or Firm* — Caldwell Intellectual Property Law

(57) ABSTRACT

A system for using artificial intelligence to present geographically relevant user-specific recommendations based on vehicle operator attentiveness includes at least a transport communication device installed in a vehicle, at least a driving condition sensor designed and configured to monitor driving conditions and generate at least a driving condition datum, at least an operator sensor, designed and configured to monitor a vehicle operator and generate at least an operator state datum, an attention state module, designed and configured to generate an attentiveness level as a function of the at least a driving condition datum and the at least an operator state datum, a location interface component, designed and configured to determine geographical location, and a recommender module, designed and configured to receive at least a local attraction datum, generate an associated output message as a function of the attentiveness level and geographical location, and provide the output message to the operator.

16 Claims, 5 Drawing Sheets

(56)                 References Cited

U.S. PATENT DOCUMENTS

| | | |
|---|---|---|
| 2007/0050279 A1 | 3/2007 | Huang et al. |
| 2008/0177653 A1 | 7/2008 | Famolari et al. |
| 2009/0157540 A1 | 6/2009 | Black et al. |
| 2011/0087430 A1 | 4/2011 | Boss et al. |
| 2013/0211863 A1 | 8/2013 | White |
| 2016/0001781 A1* | 1/2016 | Fung .................... B60K 28/02 |
| | | 701/36 |
| 2017/0067747 A1* | 3/2017 | Ricci ................... A61B 5/4809 |
| 2017/0109776 A1 | 4/2017 | Marhsak |
| 2018/0150749 A1 | 5/2018 | Wu et al. |
| 2018/0268351 A1 | 9/2018 | Jain |
| 2019/0206389 A1 | 7/2019 | Kwon et al. |

* cited by examiner

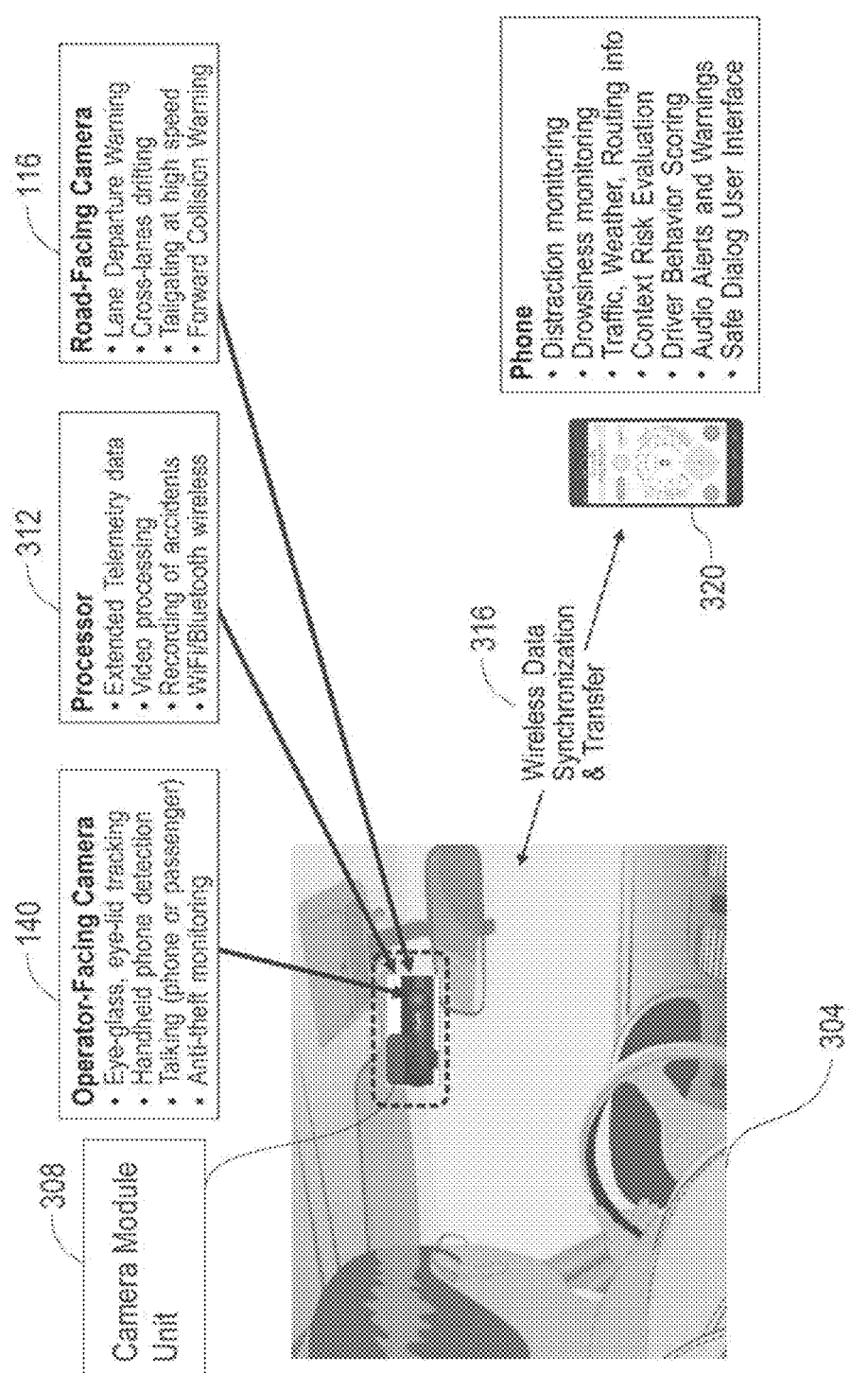

Road-Facing Camera *116*
* Lane Departure Warning
* Cross-lanes drifting
* Tailgating at high speed
* Forward Collision Warning

Processor *312*
* Extended Telemetry data
* Video processing
* Recording of accidents
* WiFi/Bluetooth wireless

Operator-Facing Camera *140*
* Eye-glass, eye-lid tracking
* Handheld phone detection
* Talking (phone or passenger)
* Anti-theft monitoring

Camera Module Unit *308*

Phone
* Distraction monitoring
* Drowsiness monitoring
* Traffic, Weather, Routing info
* Context Risk Evaluation
* Driver Behavior Scoring
* Audio Alerts and Warnings
* Safe Dialog User Interface Wireless Data Synchronization & Transfer *316*

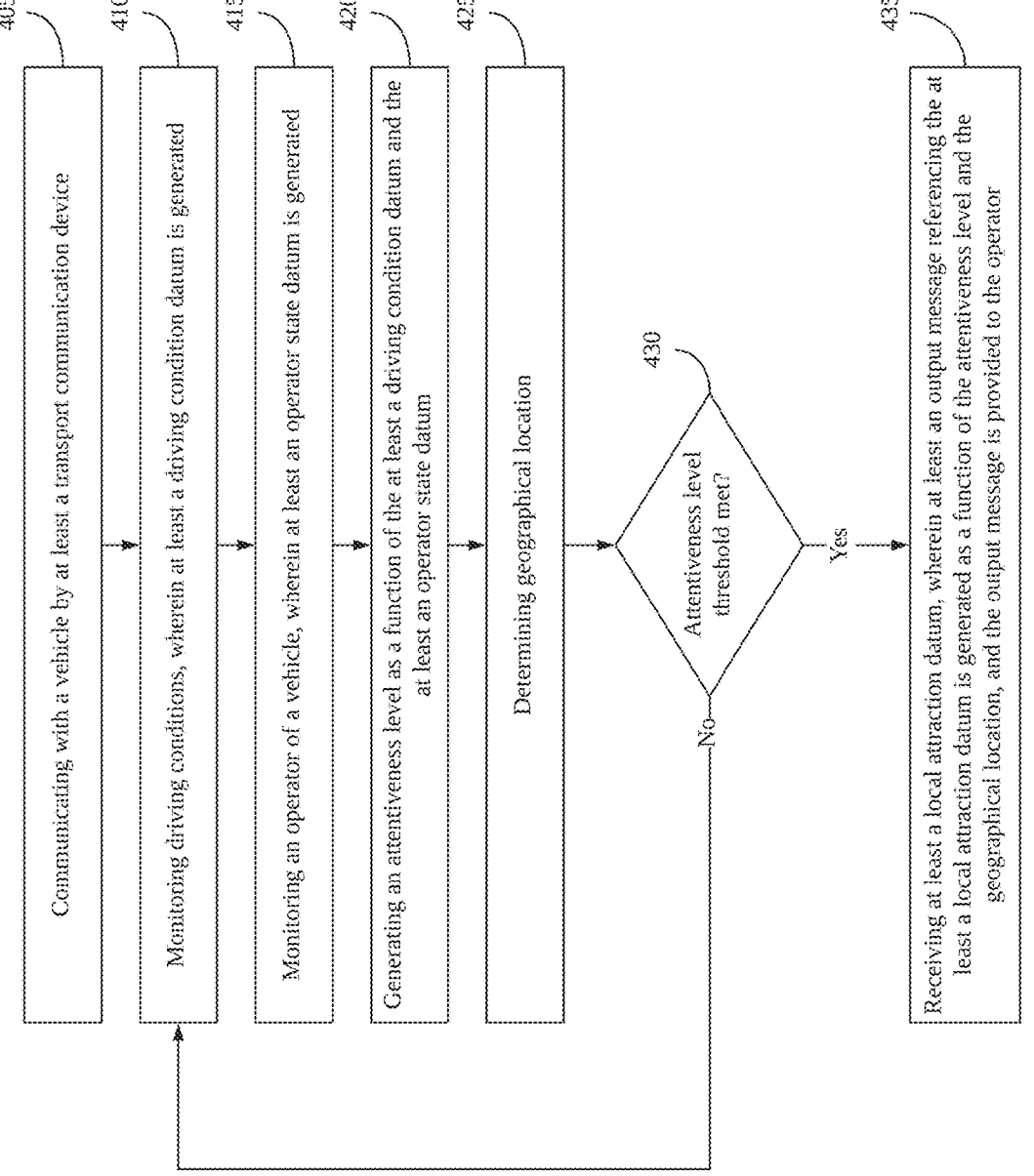

405 — Communicating with a vehicle by at least a transport communication device

410 — Monitoring driving conditions, wherein at least a driving condition datum is generated 415 — Monitoring an operator of a vehicle, wherein at least an operator state datum is generated 420 — Generating an attentiveness level as a function of the at least a driving condition datum and the at least an operator state datum 425 — Determining geographical location 430 — Attentiveness level threshold met?
No
Yes 435 — Receiving at least a local attraction datum, wherein at least an output message referencing the at least a local attraction datum is generated as a function of the attentiveness level and the geographical location, and the output message is provided to the operator

FIG. 4

SYSTEMS AND METHODS FOR USING ARTIFICIAL INTELLIGENCE TO PRESENT GEOGRAPHICALLY RELEVANT USER-SPECIFIC RECOMMENDATIONS BASED ON USER ATTENTIVENESS

CROSS-REFERENCE TO RELATED APPLICATIONS

This application is a continuation-in-part of Non-provisional application Ser. No. 16/589,241, filed on Oct. 1, 2019, and entitled "SYSTEMS AND METHODS FOR USING ARTIFICIAL INTELLIGENCE TO PRESENT GEOGRAPHICALLY RELEVANT USER-SPECIFIC RECOMMENDATIONS BASED ON USER ATTENTIVENESS," the entirety of which is incorporated herein by reference.

FIELD OF THE INVENTION

The present invention generally relates to the field of artificial intelligence. In particular, the present invention is directed to systems and methods for using artificial intelligence to present geographically relevant user-specific recommendations based on user attentiveness.

BACKGROUND

Although safer cars and improved driving assist equipment help prevent accidents, distracted driving is more than offsetting all these benefits. State bans on the use of cell phones in cars seem not to work. Mobile apps that intercept distracting calls or the use of apps are easy to circumvent, and distractions from poorly timed ads do not help. There are no current solutions that monitor driving behavior by evaluating vehicle and driver dynamics to present data of local interest which may be less distracting and more meaningful to a driver.

SUMMARY OF THE DISCLOSURE

In an aspect, a system for using artificial intelligence to present geographically relevant user-specific recommendations based on vehicle operator attentiveness includes at least a driving condition sensor, the at least a driving condition sensor designed and configured to monitor driving conditions and generate at least a driving condition datum at least an operator sensor, the at least an operator sensor designed and configured to monitor an operator of the vehicle and generate at least an operator state datum and at least a transport communication device installed in the vehicle and communicatively connected to the at least a driving condition sensor and the at least an operator sensor, the at least a transport communication device configured to determine an attentiveness level as a function of the at least a driving condition datum and the at least an operator state datum, identify an upcoming loss in network connectivity, generate an output message referencing the at least a local attraction datum as a function of the attentiveness level and the upcoming loss in network connectivity, determine that the operator is attentive based on the attentiveness level exceeding a threshold level, and provide the output message to the operator based on the determination that the operator is attentive.

In another aspect, a method of using artificial intelligence to present geographically relevant user-specific recommendations based on vehicle operator attentiveness includes receiving, by at least a transportation communication device at least a driving condition datum from at least a driving condition sensor and at least an operator state datum from at least an operator sensor, determining, by the at least a transportation communication device, an attentiveness level as a function of the at least a driving condition datum and the at least an operator state datum, identifying, by the at least a transportation communication device, an upcoming loss in network connectivity, generating, by the at least a transportation communication device, an output message referencing the at least a local attraction datum as a function of the attentiveness level and the upcoming loss in network connectivity, determining, by the at least a transportation communication device, that the operator is attentive based on the attentiveness level exceeding a threshold level, and providing, by the at least a transportation communication device, the output message to the operator based on the determination that the operator is attentive.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is a schematic diagram illustrating an exemplary embodiment of a deployed system;

FIG. 4 is a flow diagram illustrating an exemplary embodiment of a method of using artificial intelligence to present geographically relevant user-specific recommendations based on vehicle operator attentiveness is illustrated.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments described herein include a transport communication device equipped for presenting local attraction data to an operator of a vehicle once it has determined presenting such data is safe. Factors taken into account for determining a safe environment are those that may be associated with the external environment of a vehicle, such as pedestrians, weather, and traffic, and those that may be associated with the internal environment of a vehicle, such as operator attention, passengers, and music volume. Operator attention may be further evaluated based upon detection of facial and body signatures and movements that may be indicative of user being, for example, alert, distracted, drowsy, or intoxicated. Factors may be determined/evaluated with the use of numerous artificial intelligence processes. Artificial intelligence processes may also be used in selection of the local attraction data presented to an operator at a time determined to be safe, where a multitude of local attraction providers may want to be seen by an operator on a transport communication device any only a subset is shown. This may be due to an operator's preference, distance from local attraction, or any number of factors.

Figure 1:
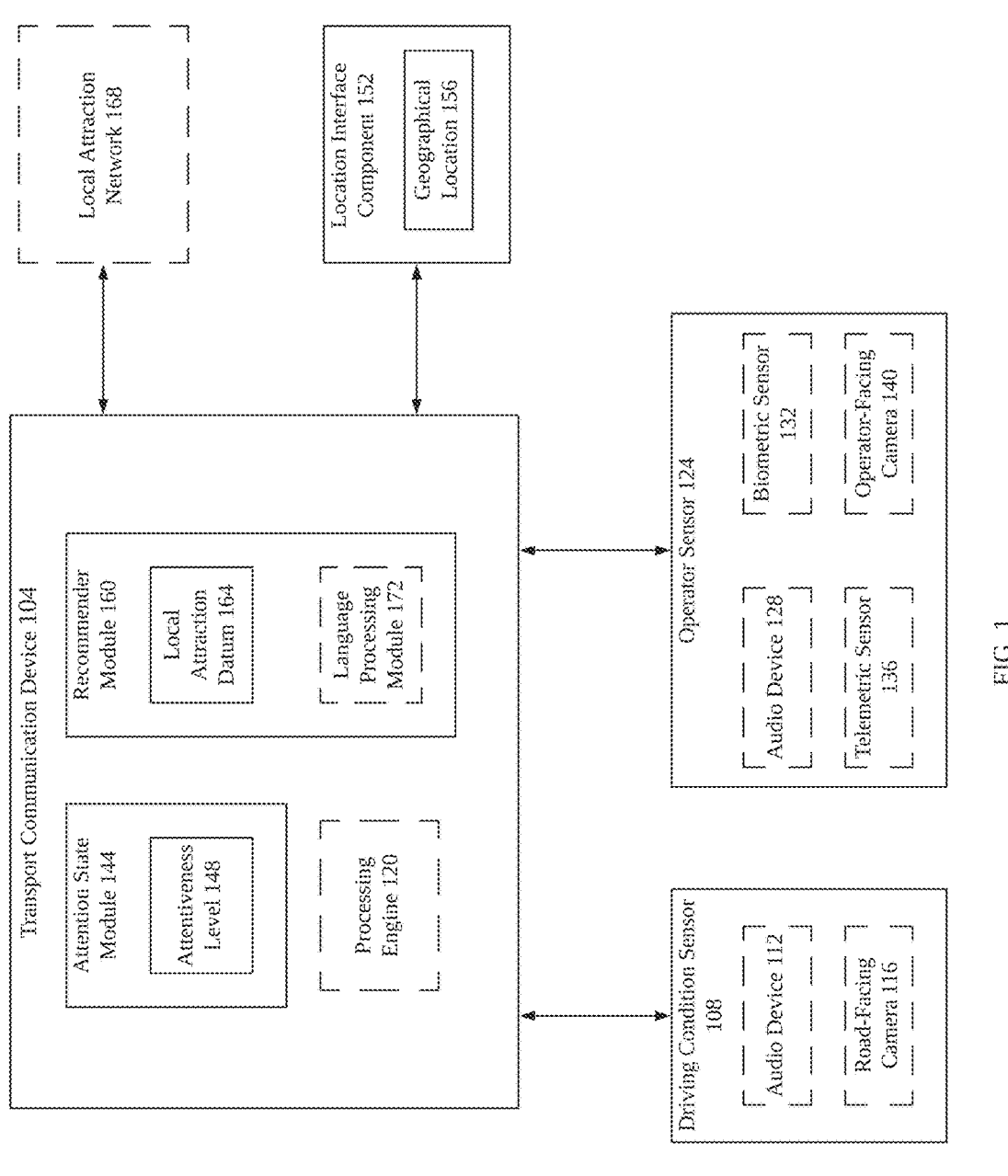
FIG. 1 is a block diagram illustrating an exemplary embodiment of a system for using artificial intelligence to present geographically relevant user-specific recommendations based on vehicle operator attentiveness.

Referring now to FIG. 1, an exemplary embodiment of system 100 for using artificial intelligence to present geographically relevant user-specific recommendations based on vehicle operator attentiveness is illustrated. System 100 includes at least a transport communication device 104 installed in a vehicle. At least a transport communication device 104 may include any computing device as described in this disclosure. At least a transport communication device 104 may be any combination of computing devices as described in this disclosure. At least a transport communication device 104 may be connected to a network as described in this disclosure; the network may be the Internet. At least a transport communication device 104 may include, for instance, a first server or cluster of servers in a first location and a second server or cluster of servers in a second location. At least a transport communication device 104 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. At least a transport communication device 104 may include one or more computing devices dedicated to data storage, security, distribution of traffic for load balancing, and the like. At least a transport communication device 104 may distribute one or more computing tasks as described below across a plurality of computing devices of at least a transport communication device 104, which may operate in parallel, in series, redundantly, or in any other manner used for distribution of tasks or memory between computing devices. At least a transport communication device 104 may be implemented using a "shared nothing" architecture in which data is cached at the worker; in an embodiment, this may enable scalability of system 100 and/or at least a transport communication device 104. As a non-limiting example, at least a transport communication device 104 may include a portable and/or mobile computing device such as without limitation a smartphone, tablet, laptop, or netbook; at least a transport communication device 104 may include a computing device integrated and/or mounted on or in a vehicle.

With continued reference to FIG. 1, at least a transport communication device 104 or any device usable as at least a transport communication device 104 as described in this disclosure, may be designed and/or configured to perform any method, method step, or sequence of method steps in any embodiment described in this disclosure, in any order and with any degree of repetition. For instance, at least a transport communication device 104 or any device usable as at least a transport communication device 104 as described in this disclosure, may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a transport communication device 104 or any device usable as at least a transport communication device 104 as described in this disclosure, may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, at least a transport communication device 104 may contain at least a processor. A processor may also be referred to as a central processing unit (CPU), central processor, or main processor, and is the electronic circuitry within a computer that carries out the instructions of a computer program by performing the basic arithmetic, logic, controlling, and input/output (I/O) operations specified by the instructions. Traditionally, the term "CPU" refers to a processor, more specifically to its processing unit and control unit (CU), distinguishing these core elements of a computer from external components such as main memory and I/O circuitry. Principal components of a CPU may include an arithmetic logic unit (ALU) that performs arithmetic and logic operations, processor registers that supply operands to the ALU and store the results of ALU operations and a control unit that orchestrates the fetching (from memory) and execution of instructions by directing the coordinated operations of the ALU, registers and other components. Most modern CPUs are microprocessors, meaning they are contained on a single integrated circuit (IC) chip. An IC that contains a CPU may also contain memory, peripheral interfaces, and other components of a computer; such integrated devices are variously called microcontrollers or systems on a chip (SoC). Some computers employ a multi-core processor, which is a single chip containing two or more CPUs called "cores"; in that context, one can speak of such single chips as "sockets". Array processors or vector processors have multiple processors that operate in parallel, with no unit considered central.

With continued reference to FIG. 1, at least a transport communication device 104 may be connected to at least a network. At least a network may include any hardware or software component. At least a network may include any of the network components as described below within this disclosure. At least a network may allow for connection of devices within system 100. Devices may include for example, desktop computer, laptop, mainframe, server, console, firewall, bridge, repeater, network interface card, switch, hub, modem, router, smartphone, tablet, webcam, general computing devices, and the like. At least a network may be configured with different network topology including for example, mesh topology, ring topology, star topology, tree topology, bus topology, and the like. Network interface device may be utilized for connecting at least a transport communication device 104 to one or more of a variety of networks, and one or more devices. Examples of a network interface device include, but are not limited to, a network interface card (e.g., a mobile network interface card, a LAN card), a modem, and any combination thereof.

Examples of a network, such as at least a network, include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Still referring to FIG. 1, at least a transport communication device 104 may be configured to determine a strength of connection to a network, which may include, without limitation a wireless network. A connection to a network may, for instance, include a wireless connection between at least a transport communication device 104 or an intervening device and a cellular communication and/or data network, including without limitation connections to cellular towers, other devices on a network, or the like. Determination of signal strength may include a determination that at least a transport communication device 104 is currently unable to send or receive data over the network, which may be termed, for the purposes of this disclosure, a "loss of connection." In some embodiments, at least a transport communication device 104 may determine that it is able to receive, but not transmit, data; for instance, at least a transport communication device 104 may receive a handshake signal or one or more packets from another device in a network, but may not receive confirmation from such a device upon transmission of a handshake signal and/or one or more packets. Alternatively or additionally, at least a transport communication device 104 may be configured to determine one or more absolute or relative measures of signal strength. For instance, at least a transport communication device 104 may measure signal strength in decibel-milliwatts or other objective measures of signal strength. Alternatively or additionally, at least a transport communication device 104 may identify signal strength according to one or more measurements and/or linguistic variable values such as "strong," "moderate," or "weak," according to placement on a numerical scale such as a scale from 1 to 5, 1 to 10, some number of "bars" of graphically represented connectivity, or the like. Signal strength may be determined according to a number of bits per second that can be transmitted and/or received over a network connection, which may be converted to linguistic variable and/or numerical scale as above. Persons skilled in the art, upon reviewing the entirety of this disclosure, will be aware of various ways in which signal strength may be assessed and/or determined.

With continued reference to FIG. 1, signal strength may be determined for a plurality of distinct transmission and/or reception sources. For example, and without limitation, at least a transport communication device 104 may perform any or all signal strength assessments as described above with regard to two or more cell towers or other devices in a wireless network. As a non-limiting illustration, a signal strength with a first cellular tower may be weak while a signal strength with a second cellular tower may be strong. In some embodiments, loss of connectivity and/or loss of connection with a first signal transmission and/or reception device may not be treated by at least a transport communication device 104 as a loss of connectivity and/or loss of connection if at least a transport communication device 104 remains capable of communication with a second signal transmission and/or reception device; in other words, at least a transport communication device 104 may identify loss of connectivity and/or loss of connection as loss of connectivity and/or loss of connection with all available transmission and/or reception devices and/or sources.

Still referring to FIG. 1, at least a transport communication device 104 may be configured to determine a rate of change of signal strength, which may include determining a rate of change of signal strength with a single signal source and/or devices and/or with multiple signal sources and/or devices as described above. A rate of change may be determined in any suitable manner, such as without limitation by measuring signal strength with one or more devices two or more times, and determining an average and/or instantaneous rate of increase or decrease of signal strength using the two or more measurements; determination may be performed using any suitable process for computational and/or algorithmic differentiation, calculation and/or averaging of one or more linear slopes between consecutive measurements, computation of slopes of splined curves connecting two or more measurement points, and/or any other process that may occur to persons skilled in the art upon reviewing the entirety of this disclosure.

With continued reference to FIG. 1, at least a transport communication device 104 may be configured to record strength of connection and/or rate of change of strength of connection, whether transmitter-specific or aggregate, periodically or repeatedly; for instance, at least a transport communication device 104 may measure, calculate, and/or store strength of connection and/or rate or change thereof some number of times per second or other unit of measurement, which number may be spaced uniformly, substantially uniformly, or non-uniformly in time. Recorded and/or calculated strength of connection and/or rate of change thereof may be stored locally in memory, such as without limitation in a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Alternatively or additionally, and still referring to FIG. 1, at least a transport communication device 104 may transmit recorded and/or calculated signal strength and/or rate of change of signal strength to a remote device and/or cloud service, for instance as described in this disclosure; remote device and/or cloud service may store such data in a database or other memory. At least a transport communication device 104 may store and/or transmit data indicating strength of connection, data indicating loss of connection, data indicating rates of change of connection, or the like with, and/or linked in data storage with, one or more related and/or contextual data such as, without limitation, data describing location, such as geographic location, proximity to landmarks, direction of travel, or the like, and which may be determined in any manner described in this disclosure, time, date, time of day or night, weather, or the like; any such stored and/or transmitted data may be stored in a database or similar data structure, and may be retrievable by any linked data or combinations of linked data. For instance, and without limitation, at least a transport communication device 104 may regularly transmit any data as described above to remote devices periodically. Transmission may be performed, for instance, where connection strength is above a threshold amount, while data may be stored locally when connection is lost and/or connection strength is below a threshold amount. For instance, and without limitation, at least a transport communication device 104 may store periodically determined signal strength and/or rate of signal strength during loss of communication and/or when signal strength is below a threshold, and may transmit all stored data when signal is restored and/or exceeds the threshold.

Continuing to refer to FIG. 1, at least a transport communication device 104 and/or a remote device may generate a list of lost and/or low connectivity places, times dates, or other conditions, which, for instance, remote device and/or cloud service may transmit such a list to at least a transport communication device 104 periodically and/or based on current conditions received therefrom; for instance, nearby lost/low connectivity regions and/or conditions may be transmitted to at least a transport communication device 104 from remote device and/or cloud service based on location, time, direction of travel, or the like, for instance as transmitted by at least a transport communication device 104 and received at remote device and/or cloud service as described above. Connectivity data records may be aggregated at remote device, cloud service, and/or at least a transport communication device 104 by location, time, and/or condition set, producing a set of data records indicative thereof, which may be periodically updated. This may enable retrieval of a single record or small number of records according to location, time, and/or condition set, which single record or small number of records may reflect results of multiple measurements.

Still referring to FIG. 1, at least a transport communication device 104 may be configured to identify an upcoming loss of communications, loss of connection, and/or loss of connectivity, which may include any such loss as described above. Identifying an upcoming loss of communications may include identifying the upcoming loss of communications with or without. For instance, and without limitation, at least a transport communication device 104 may be configured to predict a loss using trends in currently detected signal strength; for instance and without limitation, at least a transport communication device 104 may determine that one or more current connections as measured and/or calculated by at least a transport communication device 104 are waning, based on a sequence of measurements, on determined rates of change, or the like; in some embodiments, at least a transport communication device 104 may be configured to determine whether a new connection and/or a connection to a new device may be available nearby and/or gaining strength, or the like. In some embodiments, for instance, at least a transport communication device 104 may identify a trend in reduction of signal strength, that if continued at a current rate will result in a loss as described above, and/or may determine that no other signal is increasing in strength, increasing in strength sufficiently to prevent a loss, and/or is present at all.

Alternatively or additionally, and continuing to refer to FIG. 1, identifying an upcoming loss of communications may include identifying the upcoming loss of communications as a function of a plurality of historical connection data. For instance, and without limitation, at least a transport communication device 104 may be configured to identify an upcoming loss of communication by matching current location, time, direction of travel, and/or other conditions to list of lost/low connectivity places, times dates, or other conditions; for instance, one or more data recorded and/or reported by at least a transport communication device 104 may be used by at least a transport communication device 104 and/or a remote device and/or cloud service to retrieve a record from a database containing such a list, and/or to use a lazy learning or other machine-learning and/or classification process to match detected and/or calculated data to a record in such a list based on vector proximity or the like. Alternatively or additionally, at least a transport communication device 104 may be configured to identify an upcoming loss by generating a query to local and/or remote data storage, and/or sending and/or recording a periodic update as above, and receiving historical data and/or alerts indicating lost or low connectivity in records linked thereto.

Still referring to FIG. 1, remote device and/or at least a transport communication device 104 may generate a machine-learning model that inputs location and/or other conditions and/or data as described above and outputs an identification of an upcoming loss of connectivity, probability of an upcoming loss of connectivity, or the like. For instance, and without limitation, any recorded, transmitted, and/or stored data may be used as training examples correlating changes in signal strength, rates of change of signal strength, and/or losses as described above with any or all other data as described above. At least a transport communication device 104 and/or a remote device and/or cloud service may train any type of machine-learning model described in this disclosure using any process described in this disclosure to identify an upcoming loss, calculate a probability of upcoming loss, and/or match one or more data as recorded, calculated, and/or transmitted by at least a transport communication device 104 to a record of a previous loss. A machine-learning model and/or classifier so trained may be transmitted, for instance, to at least a transport communication device 104, which may instantiate and use it locally, may further train it, or the like. Models and/or classifiers may be trained and/or stored as specific to one or more sets of data such as without limitation geographical location, time of day, weather, or the like; such specific models and/or classifiers may be retrieved, instantiated, and/or used based on such data.

With continued reference to FIG. 1, at least a transport communication device 104 is installed in a vehicle, such as without limitation an automobile, car, truck, sports utility vehicle, motorcycle, or the like; mounting may be performed in any suitable manner including without limitation examples as disclosed in further detail below, including incorporation into vehicle, mounting to an external feature such as a hood, mirror, or the like, mounting to an internal feature such as a rear-view mirror, dashboard, steering wheel, windshield, or the like, or any combination thereof. At least a transport communication device 104 may be configured to communicate with the vehicle. At least a transport communication device 104 may be in communication with a car via any wired connected, wireless connection, USB connection, Bluetooth connects, or the like. at least a transport communication device 104 may monitor the driving conditions, environment external to the vehicle, vehicle operator state, environment internal to the vehicle, and the like with a multitude of sensors, cameras, and other such computing devices as mentioned below and throughout this disclosure. Determinations of safety and/or risk, and/or communication, may be performed without limitation as disclosed in U.S. Nonprovisional application Ser. No. 17/835,010, filed on Jun. 8, 2022, and entitled "SYSTEMS AND METHODS FOR INCREASING THE SAFETY OF VOICE CONVERSATIONS BETWEEN DRIVERS AND REMOTE PARTIES," the entirety of which is incorporated herein by reference.

With continued reference to FIG. 1, system 100 includes at least a driving condition sensor 108 in communication with the at least a transport communication device 104, the at least a driving condition sensor 108 designed and configured to monitor driving conditions and generate at least a driving condition datum. As used herein, a sensor is a device, module, or subsystem whose purpose is to detect events or changes in its environment and send the information to other electronics, frequently a computer device. Sensors may communicate with the at least a transport communication device 104 using any suitable wired and/or wireless protocol as described in this disclosure; for instance, and without limitation, one or more sensors may be embedded in the at least a transport communication device 104 or in an associated computer device, such as a mobile phone. At least a driving condition sensor 108 include and/or be incorporated in as any computing device as described herein, including without limitation any device suitable for use as at least a transport communication device 104, and/or as any hardware and/or software module incorporated in, operating on, or in communication with such a computing device. At least a driving condition sensor 108 may monitor the external environment of a vehicle in a continuous fashion for detection of, as non-limiting examples, other vehicles, weather conditions, pedestrians, bikers, buildings, sidewalks, driving lanes, guardrails, stoplights, traffic conditions, and the like. Monitoring information extracted by the least a driving condition sensor 108 may be compiled into at least a driving condition datum to give the overall state of a current driving condition.

With continued reference to FIG. 1, at least a driving condition sensor 108 may contain temperature sensors capable of detecting the exterior temperature of a vehicle. At least a driving condition sensor 108 may include proximity sensors at the front, rear, and sides of a vehicle used for object detection. Proximity sensors may further include, for example, ultrasonic sensors, a type of sonar using echo-times from sound waves that bounce off nearby objects, to identify how far away the vehicle is from said object and alert the operator the closer a vehicle gets, electromagnetic sensors which create an electromagnetic field around the vehicle and offer an alert whenever objects enter it, and radar sensors which use radio waves to determine a vehicle's surroundings. Proximity sensors may be used in blind-spot detection. Proximity sensors may be used in parking assistance when combined with automated-steering capabilities of a vehicle. Proximity sensors, especially radar sensors, may be used in adaptive cruise control to monitor the traffic ahead and focus on the car in-front in the same lane, wherein the car is instructed by the system to stay behind the vehicle by a few seconds and with the vehicle picking up speed or slowing down depending on the vehicle in-front. Radar sensors may be ideal when detecting objects in difficult to see situations such as heavy weather, as its radio waves can penetrate fog, snow, and rain and may alert an operator about the conditions obscured by these poor conditions. Radar sensors may aid in and detect, for example, brake assist, lane-change assist, collision avoidance, emergency braking, and cross traffic monitoring. At least a driving condition sensor 108 may include LiDAR (Light Detection and Ranging) sensors which user lasers to determine distance to objects by spinning a laser across its field of view and measuring the individual distances to each point that the laser detects, creating an extremely accurate 3D scan of the environment around the vehicle.

With continued reference to FIG. 1, at least a driving condition sensor 108 may further include at least an audio device with audio input configured for auditory recording of vehicle external environment. At least a driving condition sensor 108 may further include at least an audio device with audio output configured for auditory projecting in vehicle external environment. At least an audio device 112 includes at least an audio device configured with audio input and/or at least an audio device configured with audio output. At least an audio device 112 may be implemented as any computing device as described herein, including without limitation any device suitable for use as at least a transport communication device 104, and/or as any hardware and/or software module incorporated in, operating on, or in communication with such a computing device. At least an audio device 112 may include one or more audio inputs such as without limitation one or more microphones. At least an audio device 112 may include audio devices with audio input configured to record the noise level/loudness of objects and/or events in the environment external to a vehicle, nonlimiting examples including noise from surrounding traffic, weather events, sirens, pedestrians, and the like. At least an audio device 112 may be configured to record the noise level/loudness of objects and/or events in the environment external to a vehicle while driving conditions are being monitored by at least a driving condition sensor 108, wherein recorded noise level/loudness may be used in generating at least a driving condition datum. At least an audio device 112 may include one or more audio outputs such as without limitation one or more speakers. At least an audio device 112 may include at least an audio device configured with audio input and at least an audio device configured with audio output combined together; for instance, as components of a single computing device incorporated in at least a driving condition sensor 108. At least an audio device 112 may include at least an audio device configured with audio input and at least an audio device configured with audio output disposed separately. As a non-limiting example, audio input and output devices may be contained in a speakerphone, which may be any mobile device or telephonic device capable of acting as a speakerphone; speakerphone may be used to position a microphone and speaker in a suitable location pointing away from operator for interaction with external environment.

With continued reference to FIG. 1, at least a driving condition sensor 108 of system 100 may include at least a road-facing camera 116 configured to capture a video feed of conditions external to the vehicle. At least a road-facing camera 116 may include a processor and may be implemented as any computing device as described herein, including without limitation any device suitable for use as at least a transport communication device 104, and/or as any hardware and/or software module incorporated in, operating on, or in communication with such a computing device. A USB, wired, or wireless connection may provide data transfer between at least a road-facing camera 116, at least a driving condition sensor 108, and/or at least a transport communication device 104. At least a road-facing camera 116 may include, as non-limiting examples, cameras integrated into mobile devices such as cellular phones and/or smartphones, portable cameras, permanent cameras, semi-permanent cameras, factory-fitted vehicle cameras, and the like. "At least a road-facing camera" 116, as used in this disclosure, is a camera oriented away from an operator, such imagery captured by at least a road-facing camera 116 represents conditions exterior to the operator; at least a road-facing camera 116 may be oriented in a current or likely future direction of travel of the operator, including capturing a view ahead of a vehicle and/or behind a vehicle, and/or being held and/or mounted in front of an operator who is standing, biking, and/or walking forward, or in any other direction relevant to monitoring of driving conditions. As a non-limiting example, at least a road-facing camera 116 may be attached to the inside windshield of a vehicle oriented in the opposite direction of the vehicle operator. As another non-limiting example, at least a road-facing camera 116 may be attached under the rear bumper of a vehicle oriented towards to rear of a vehicle. As another non-limiting example, at least a road-facing camera 116 may be attached to the operator- and passenger-side mirrors oriented towards the front and sides of a vehicle. As another non-limiting example, at least a road-facing camera 116 may detect lane lines, distance from vehicles in front, distance from objects other than vehicles, and perform scene analysis and recording. At least a road-facing camera 116 may track and/or associate together data obtained from and/or derived using accelerometers, gyroscopes, compasses, and/or GPS facilities. As used herein, a "video feed" is a series of samples or frames of light patterns captured by light-sensing and/or detection mechanisms of road-facing camera 116; series of frames and/or samples may be temporally ordered for sequential display, creating a simulation of continuous and/or sequential motion over time. Road-facing camera 116 is configured to capture video feed of a field of vision; "field of vision" as defined herein is a range within which road-facing camera 116 captures visual data, for instance and without limitation, a spatial range of light from objects from which is focused onto light-sensing elements of road-facing camera 116 using lenses or other optical elements of road-facing camera 116.

With continued reference to FIG. 1, at least a road-facing camera 116 may be implemented in any manner suitable for use as a camera and/or camera unit as described in this disclosure below. At least a road-facing camera 116 may include a digital camera. At least a road-facing camera 116 may include a charge-coupled-device (CCD) image sensor which captures photons as electrical charges in each photosite (a light-sensitive area that represents a pixel), where after exposure the charges are swept off the chip to an amplifier located in one corner of the sensor, and where external circuitry converts the analog signal to digital form and handles memory storage. At least a road-facing camera 116 may include a complementary metal-oxide semiconductor (CMOS) image sensor, which includes solid-state circuitry at each and every photosite, and can manipulate the data for each pixel right in the sensor, allowing CMOS sensors to respond to lighting conditions in ways that a CCD imager cannot as every photosite can be accessed individually. At least a road-facing camera 116 may include a Foveon X3 image sensor which uses an array of photosites, each of which consists of three vertically stacked photodiodes, organized in a two-dimensional grid, with each of the three stacked photodiodes responding to different wavelengths of light so each has a different spectral sensitivity curve, the signals from the three photodiodes then being processed to result in data that provides the amounts of three additive primary colors, red, green, and blue. At least a road-facing camera 116 may include a Live MOS image sensor which achieves the same image quality as CCD-based sensors while keeping energy consumption down to CMOS levels. At least a road-facing camera 116 may include advanced image sensors such as, without limitation, red, green, blue (RGB) sensors, infrared sensors, and/or near-infrared (NIR) sensors which include multispectral image sensors and modified RGB sensors. At least a road-facing camera 116 may include none, one, or any number of combinations of the aforementioned sensors to achieve monitoring of driving conditions.

With continued reference to FIG. 1, a video feed by the at least a road-facing camera 116 may further include detecting external objects and generating at least a driving condition datum as a function of the detected external objects. External objects include things present in the environment external to a vehicle, non-limiting examples being other vehicles, weather conditions, pedestrians, bikers, buildings, sidewalks, driving lanes, guardrails, stoplights, traffic conditions, and the like. External object detection may include identifying detected objects. External object detection may include tracking detected objects. Detecting external objects may further include comparing a first frame of the video feed to a second from of the video feed and determining that a number of pixels exceeding a threshold amount has changed with respect to at least a parameter from the first frame to the second frame. "Parameters" as used herein for at least a road-facing camera 116 may include a multitude of parameters such as location, speed, acceleration, braking, cornering, throttle aperture, time of day, weather conditions, traffic information, proximity to surrounding cars (ahead, behind, on the side), positioning in lane, external acoustic noises, video recording of key events (e.g. crashes), and the like. A parameter change is a change in a parameter of one or more pixels that exceeds some threshold of number of pixels experiencing the change per unit of time and/or framerate. As a non-limiting example, detecting a parameter change may include comparing a first frame of a video feed to a second frame of the video feed, and determining that a threshold number of pixels has changed with respect to at least a parameter from the first frame to the second frame. First and second frames may be consecutive, and/or may be separated by one or more intermediate frames. A frequency or sample rate with which at least a road-facing camera 116 samples frames may be selected to capture likely degrees of change reflecting motion of objects to which a user would be likely to need to respond; for instance, a sample rate may be set to sample frames frequently enough to detect parameter changes consistent with motion of vehicles, pedestrians, bicyclists, animals, or the like. Selection of frame rate may be determined using a machine-learning process; for instance, where object analysis and/or classification has been performed, as described below, to identify objects in similar video feeds, motion of such objects and rates of pixel parameter changes in video feeds may be correlated in training data derived from such video feeds, and used in any machine-learning, deep learning, and/or neural network process as described below to identify rates of pixel parameter change consistent with motion of classified objects. Such identified rates, in turn may be used to set a frame sample rate for at least a road-facing camera 116. Rates of change consistent with object motion may likewise be used to select a threshold degree of pixel changes, such as a threshold number of pixels with changed parameters, that may be used to detect changes in field of vision. In an embodiment, detected changes may be used to identify external objects to be detected; for instance, object detection, for instance as described in further detail below, may be performed regarding areas or pixels experiencing more rapid parameter changes prior to areas experiencing less rapid parameter changes. As a non-limiting example, a first object-detection process may be performed on pixels with regard to which rates parameter changes above a threshold as described above have been detected, while a second and subsequent object detection process may be performed with regard to pixels not used in the first object detection process; this may cause object detection to prioritize rapidly changing objects over objects changing less rapidly.

With continued reference to FIG. 1, at least a road-facing camera 116 external object detection may be performed by any combination of sensor types and/or camera types and/or computer devices, as described separately above. Methods for external object detection may include, as non-limiting examples, a template matching technique, a Viola-Jones object detection framework based on Haar features, a scale-invariant feature transform (SIFT), a histogram of oriented gradients (HOG), region proposals (R-CNN, Fast R-CNN, Faster R-CNN), a single shot multibox detector (SSD), a You Only Look Once (YOLO) framework, other machine-learning processes, other deep learning processes, other artificial intelligence processes, or the like, or any combination of the like. A processing engine 120 may perform one or more artificial intelligence processes to detect external objects at any given time using a machine-learning model or deep learning model; for instance, and without limitation, processing engine 120 may determine a type and/or degree of operator of inattention. Processing engine 120 may perform any determination, classification, and/or analysis steps, methods, processes, or the like as described in this disclosure using machine-learning processes. A machine-learning process is a process that automatedly uses a body of data known as "training data" and/or a "training set" to generate an algorithm that will be performed by a computing device/module to produce outputs given data provided as inputs; this is in contrast to a non-machine-learning software program where the commands to be executed are determined in advance by a user and written in a programming language.

With continued reference to FIG. 1, training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by processing engine 120 may correlate any input data as described in this disclosure to any output data as described in this disclosure. As a non-limiting illustrative example, training data may associate operator-related data and/or vehicular dynamics data with a degree of operator inattention; such data may be received, for instance, from one or more implementations of systems and/or methods described herein, and/or using one or more entries from users and/or persons evaluating a degree of operator inattention during one or more incidents. For instance, a person may observe one or more operators who are performing vehicular maneuvers such as driving on a training course and/or on a public street and enter data indicative of a degree of attention and/or inattention, which may be combined by a computing device such as processing engine 120 with one or more elements of operator-related and/or vehicular dynamics data to create one or more data entries of training data to be used in machine-learning processes. As a further example, training data may include sensor data recorded during, before, and/or after an accident which may be combined with one or more elements of information concerning circumstances of the accident, such as a degree to which an operator was a fault and/or failed to identify a risk correctly and take expected evasive measures. As a further example, training data may correlate data describing conditions exterior to a vehicle, such as road conditions, behavior of other vehicles, pedestrian, bicyclist, and/or animal behavior, or the like, to risk levels and/or outcomes associated with risk levels such as accidents, collisions, or the like; such data may be collected by implementations of systems as described herein, for instance by recording data during, before, or after collisions or accidents as described in this disclosure. Recorded data as it relates to at least an operator state datum and at least a driving condition datum may be referred to as historical operator data and historical driving condition data, respectively. For instance, and without limitation, historical operator data may describe past data captured using at least an operator sensor and/or past operator performance data such as data indicative of operator reaction times, degree to which an operator was a fault and/or failed to identify a risk correctly and take expected evasive measures, or the like. Historical driving condition data may include any data sensed using at least a driving condition sensor, data describing a condition of vehicle, and/or data describing particular outcomes, such as without limitation outcomes associated with risk levels as described above; historical driving condition data may be correlated to historical operator data, or in other words historical driving data may be combined with in an entry and/or otherwise linked to operator data that was collected concerning an incident or time period during which historical driving condition data was collected As a further non-limiting example, training data may associate any data from a sensor, camera, vehicle, or operator, as mentioned in this disclosure herein, or any combination of the like, which detect external objects, operator face contours, operator speech and the like, to assess driving conditions, operator distractibility, operator alertness, or the like. Various other examples of training data and/or correlations that may be contained therein are provided in this disclosure; persons skilled in the art, upon reviewing the entirety of this disclosure, will be aware of various examples of training data that may be used consistently with the instant disclosure.

Still referring to FIG. 1, processing engine 120 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 1, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods or lazy naïve Bayes methods.

Continuing to refer to FIG. 1, machine-learning algorithms may include, without limitation, a lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. Non-limiting examples of lazy-learning processes may include K-nearest neighbors processes or similar techniques for retrieving an output from one or more data entries matching input data according to a given matching protocol.

Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 1, machine-learning algorithms may include supervised machine-learning algorithms. Supervised machine-learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include sensor data and/or data produced via analysis as described above as inputs, degrees of risk and/or degrees of operator inattentiveness as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine-learning algorithms that may be used to determine relation between inputs and outputs. In an embodiment, external objects detected by at least a road-facing camera 116 using any such method as described above may be used in generating at least a driving condition datum.

With continued reference to FIG. 1, system 100 includes at least an operator sensor 124 in communication with the at least a transport communication device 104, the at least an operator sensor 124 designed and configured to monitor an operator of the vehicle and generate at least an operator state datum. At least an operator sensor 124 may include, be included in, and/or be connected to any computing device as described herein, including without limitation any device suitable for use as at least a transport communication device 104, and/or as any hardware and/or software module incorporated in, operating on, or in communication with such a computing device. At least an operator sensor 124 may monitor the internal environment of a vehicle in a continuous fashion for detection of, as non-limiting examples, operator identification, steering wheel motion, orientation of operator face, orientation of operator eyes, operator eyelids closing patterns, hands position and gestures, spoken utterances and their transcription, acoustic noises in the cabin, operator head movements such as yaw, pitch, and roll, and the like. Yaw is defined for purposes of this disclosure as horizontal movement (left to right) of an operator's face, pitch is defined for the purposes of this disclosure as vertical movement (up to down), such as an axis about which the operator's head and/or neck might rotate to nod "yes" leaning forward and back, and roll is defined for the purposes of this disclosure as side-to-side tilting of the head, leaning left or right. Monitoring with the mentioned variables may be correlated with the road ahead of vehicle, left mirror, right mirror, central rearview mirror, instrument cluster, center dash, passenger seat, mobile phone in hand, or the like; such detection may, without limitation, be performed using an operator-facing camera as described in further detail below. Monitoring information extracted by the least a driving condition sensor 108 may be compiled into at least an operator state datum to give the overall state of a current operator, which may include state of alertness and/or distractibility. At least an operator sensor 124 may be configured as any sensor described above in reference to at least a driving condition sensor 108.

With continued reference to FIG. 1, at least an operator sensor 124 may further include at least an audio device configured with audio input. At least an operator sensor 124 may further include at least an audio device configured with audio output. At least an audio device 128 includes at least an audio device configured with audio input and/or at least an audio device configured with audio output. At least an audio device 128 may be implemented as any computing device as described herein, including without limitation any device suitable for use as at least a transport communication device 104, and/or as any hardware and/or software module incorporated in, operating on, or in communication with such a computing device. At least an audio device 128 may include one or more audio inputs such as without limitation one or more microphones. At least an audio device 128 may include audio devices with audio input configured to record the noise level/loudness of objects and/or events in the environment internal to a vehicle, nonlimiting examples including noises from the audio system of a vehicle, vocal noises from operator, vocal noises from passengers, air conditioning unit noises, and the like. At least an audio device 128 may be configured to record the noise level/loudness of objects and/or events in the environment internal to a vehicle while driving conditions are being monitored by at least an operator sensor 124, wherein recorded noise level/loudness may be used in generating at least an operator state datum. At least an audio device 128 may include one or more audio outputs such as without limitation one or more speakers. At least an audio device 128 may include at least an audio device configured with audio input and at least an audio device configured with audio output combined together; for instance, as components of a single computing device incorporated in at least an operator sensor 124. At least an audio device 128 may include at least an audio device configured with audio input and at least an audio device configured with audio output disposed separately. As a non-limiting example, audio input and output devices may be contained in a speakerphone, which may be any mobile device or telephonic device capable of acting as a speakerphone; speakerphone may be used to position a microphone and speaker in a suitable location within a vehicle for communication with an operator, such as on a visor close to the operator.

With continued reference to FIG. 1, wherein the at least an operator sensor 124 may further include at least a biometric sensor 132. At least a biometric sensor 132 may be implemented as any computing device as described herein, including without limitation any device suitable for use as at least a transport communication device 104, and/or as any hardware and/or software module incorporated in, operating on, or in communication with such a computing device. At least a biometric sensor 132 may be a transducer, semiconductor, wireless device, or the like coupled with a sensor, camera, or any combination of sensors and/or cameras as described in this disclosure, which allow for operator biometric extraction including, without limitation, fingerprints, facial recognition, iris recognition, speech recognition, hand geometry, heartbeat, heart rate, breathing patterns, blood pressure, temperature, sweat level, and the like. At least a biometrics sensor 132 may include without limitation wearable biometric sensors and/or biometric sensors built into a vehicle such as sensors on a steering wheel, sensors on an operator seat, and the like. Biometric extraction data may relate to, without limitation, features relating to operator emotional and/or physiological states such as fatigue, stress, reaction to startling or scary events, arousal, attentiveness, distractedness, health, mood, vital signs (including without limitation galvanic skin response (GSR), or heart rate variability (HRV) data, or the like) and the like. Biometric extraction data from at least a biometric sensor 132 may be used in generating at least an operator state datum by the at least an operator sensor 124.

With continued reference to FIG. 1, wherein the at least an operator sensor 124 further comprises at least a telemetric sensor 136 configured to extract at least a datum from a vehicle. At least a telemetric sensor 136 may be implemented as any computing device as described herein, including without limitation any device suitable for use as at least a transport communication device 104, and/or as any hardware and/or software module incorporated in, operating on, or in communication with such a computing device. At least a telemetric sensor 136 may use, as non-limiting examples, wireless data transfer mechanisms (e.g., using radio, ultrasonic, or infrared systems), or data transferred over other media such as a mobile device, computer network, optical link, USB, or other wired communication, to extract at least a datum from a vehicle. At least a telemetric sensor 136 may be connected to an onboard diagnostics unit of a vehicle. At least a datum extracted from a vehicle may include, as non-limiting examples, vehicular data such as vehicular identification number (VIN), odometer readings, measures of rotations per minute (RPM), engine load, miles per gallon, or any other diagnostic information normally provided by an onboard diagnostics unit. Vehicle data from at least a telemetric sensor 136 may be used in generating at least an operator state datum by the at least an operator sensor 124.

With continued reference to FIG. 1, at least a driving condition sensor 108 of system 100 may include at least an operator-facing camera 140 configured to capture a video feed of the operator. At least an operator-facing camera 140 may include a processor and may be implemented as any computing device as described herein, including without limitation any device suitable for use as at least a transport communication device 104, and/or as any hardware and/or software module incorporated in, operating on, or in communication with such a computing device. A USB, wired, or wireless connection may provide data transfer between at least an operator-facing camera 140, at least a driving condition sensor 108, and/or at least a transport communication device 104. At least an operator-facing camera 140 may include, as non-limiting examples, cameras integrated into mobile devices such as cellular phones and/or smartphones, portable cameras, permanent cameras, semi-permanent cameras, factory-fitted vehicle cameras, and the like. "At least an operator-facing camera" 140, as used in this disclosure, is a camera oriented towards a vehicle operator, such imagery captured by at least an operator-facing camera 140 represents conditions internal to a vehicle cabin and operator's self; at least an operator-facing camera 140 may be oriented in a way to capture a best view of an operator's face, body, and/or internal vehicle cabin while minimizing interferences with road view. At least an operator-facing camera 140 may be held and/or mounted in front of an operator who is standing, biking, and/or walking forward, or in any other direction relevant to monitoring operator state. At least an operator-facing camera 140 may include any camera as described above in reference to at least a road-facing camera 116. At least an operator-facing camera 140 may capture a video feed from a field of vision as described above in reference to at least a road-facing camera 116. At least an operator-facing camera 140 may be coupled to any type of sensor as described above in reference to at least a road-facing camera 116. At least a road-facing camera 116 may be housed together with at least an operator-facing camera 140 or may be housed separately; in an embodiment, each of at least a road-facing camera 116 and at least an operator-facing camera 140 may be connected to a dedicated processor, or both may be connected to and/or in communication with the same processor. At least an operator-facing camera 116 may be mounted and/or attached to any suitable structure and/or portion of a vehicle; as a non-limiting example, at least an operator-facing camera 140 may be mounted next to a rearview mirror (attached to windshield or to body of rearview mirror).

With continued reference to FIG. 1, wherein capturing the video feed of the operator by the at least an operator-facing camera 140 may further include detecting operator face contours and generating at least an operator state datum as a function of the detected operator face contours. Detecting operator face contours may include identifying eyes, nose, and/or mouth to evaluate yaw, pitch, roll of the face, orientation of operator eyes and eye gaze direction, orientation of operator face, operator eyelids closing patterns, or the like. At least an operator-facing camera 140 may also detect body languages including hand positions and gestures of operator and passengers, position of operator in driver's seat, amount of operator movement, amount of passenger movement, or the like. At least an operator-facing camera 140 may also detect internal objects including a mobile phone in hand of operator, steering wheel and motion, rear-view mirror, driver and passenger seats, vehicle passengers, objects which are not passengers or part of the vehicle, and the like. Detecting operator face contours may include identification the part of the face detected. Detecting operator face contours may include tracking of those parts of the face detected. Detecting operator face contours may further include comparing a first frame of the video feed to a second from of the video feed and determining that a number of pixels exceeding a threshold amount has changed with respect to at least a parameter from the first frame to the second frame. "Parameters" as used herein for at least an operator-facing camera 140 may include a multitude of parameters such as those things referred to in detecting face contours. A parameter change is a change in a parameter of one or more pixels that exceeds some threshold of number of pixels experiencing the change per unit of time and/or framerate. As a non-limiting example, detecting a parameter change may include comparing a first frame of a video feed to a second frame of the video feed, and determining that a threshold number of pixels has changed with respect to at least a parameter from the first frame to the second frame. First and second frames may be consecutive, and/or may be separated by one or more intermediate frames. A frequency or sample rate with which at least an operator-facing camera 140 samples frames may be selected to capture likely degrees of change reflecting motion of objects to which a user would be likely to need to respond; for instance, a sample rate may be set to sample frames frequently enough to detect parameter changes consistent with motion of operator head, eyes, or mouth, motion of passengers, motion of operator hands, motion of steering wheel, or the like. Selection of frame rate may be determined using a machine-learning process; for instance, where object analysis and/or classification has been performed, as described above, to identify objects in similar video feeds, motion of such objects and rates of pixel parameter changes in video feeds may be correlated in training data derived from such video feeds, and used in any machine-learning, deep learning, and/or neural network process as described below to identify rates of pixel parameter change consistent with motion of classified objects. Such identified rates, in turn may be used to set a frame sample rate for at least an operator-facing camera 140. Rates of change consistent with object motion may likewise be used to select a threshold degree of pixel changes, such as a threshold number of pixels with changed parameters, that may be used to detect changes in field of vision.

With continued reference to FIG. 1, at least an operator-facing camera 140 detecting operator face contours may be performed by any combination of sensor types and/or camera types and/or computer devices, as described separately above. Methods for operator face contours detection may include, as non-limiting examples, those methods that may be used for external object detection by at least a road-facing camera 116 as described above. A processing engine 120 may perform one or more artificial intelligence processes to detect face contours at any given time using a machine-learning model or deep learning model; for instance, and without limitation, those models mentioned above for external object detection by at least a road-facing camera 116. In an embodiment, operator face contours detected by at least an operator-facing camera 140 using any such method as described above may be used in generating at least an operator state datum.

With continued reference to FIG. 1, at least an operator sensor 124 may be further configured to generate at least an operator state datum by determining a direction of operator focus. The direction of operator focus, as used herein, refers to the orientation of the operator's eyes (eye gaze), for example straight ahead at the road, down at something internal to the vehicle such as a mobile phone, to the left outside the driver side window where a distracting even may be occurring, or the like. Detection and tracking of operator's eye may be performed by any combination of sensor types and/or camera types and/or computer devices, as described above.

In an embodiment, and still referring to FIG. 1 generating an operator state datum may include calculating a spatial difference may be calculated between the direction of operator focus and a spatial location (such as an object internal or external to the vehicle). For instance, and without limitation, detecting may include determining a direction of user focus, calculating a spatial difference between the direction of user focus and a spatial location of an object determined detected above using road-facing camera, and generating at least an operator state datum as a function of the spatial difference. Spatial difference may include, without limitation, an angle between a vector from the operator to spatial location of an object/event/distraction and a vector in a direction of current operator eye gaze, as measured using cosine similarity or the like. As a non-limiting example, an operator of a vehicle may be driving through a narrow construction zone on a highway where operator driving attentively would be constantly looking out for construction workers, cones, vehicles, and guardrails, generating at least an operator state data via spatial difference calculation indicating a distracted driver. As another non-limiting example, an operator of a vehicle may be regularly looking at fast-food restaurants as they pass by, which may be detected by a combination of tracking user eye gaze, geolocation via GPS, and a combination of sensors and cameras configured to detect external objects; in this case, it may be determined that the operator is still attentive and at least a local attraction datum from a fast-food restaurant is presented to the operator as a function of operator eye gaze directed at fast-food restaurants.

With continued reference to FIG. 1, at least a transport communication device 104 of system 100 includes an attention state module 144, the attention state module 144 designed and configured to generate an attentiveness level 148 as a function of at least a driving condition datum and at least an operator state datum. Attention state module 144 may include a processor and may be implemented as any computing device as described herein, including without limitation any device suitable for use as at least a transport communication device 104, and/or as any hardware and/or software module incorporated in, operating on, or in communication with such a computing device. "Attentiveness level" 148 as used herein refers to thresholds that need to be met using at least a driving condition datum and at least an operator state datum to determine if an operator is attentive, distracted, drowsy, drunk, or the like. Attentiveness level 148 is used by a recommender module for generating an output of local attraction datum, assuming the operator is no determined to be inattentive or distracted. In an embodiment and as mentioned above, at least a driving condition datum may contain any information/data extracted by at least a driving condition sensor 108, at least an audio device 112, at least a road-facing camera 116, or any other computing device which extracts information from the environment external to a vehicle, or any combination of such devices herein. In an embodiment and as mentioned above, at least an operator state datum may contain any information/data extracted by at least an operator sensor 124, at least an audio device 128, at least a biometric sensor 132, at least a telemetric sensor 136, at least an operator-facing camera 140, or any other computing device which extracts information from the environment internal to a vehicle, or any combination of such devices herein. In an embodiment, and non-limiting, a neural network or machine-learning process as described above may be implemented for computing attentiveness level 148. In an embodiment, and as a non-limiting example, a neural network, for instance as described above, may be used to analyze external and internal extracted parameters to determine if operator is attentive. As a non-limiting example, attention state module 144 may receive data indicating minimal traffic, minimal noise, and operator's head and eyes are oriented towards the road, wherein an attentiveness level 148 is generated affirming driver is attentive and not distracted. As another non-limiting example, attention state module 144 may receive data indicating heavy rainfall, loud music inside the vehicle, operator auditory cues and mouth movements indicative of singing, and rapid head movements, wherein an attentiveness level 148 is generated affirming driver is inattentive and distracted. As another non-limiting example, attention state module 144 may receive data indicating minimal traffic, minimal noise, constant closing of operator's eyes, and head bobbing head movements, wherein an attentiveness level 148 is generated affirming operator is drowsy and thus inattentive.

With continued reference to FIG. 1, attention state module 144 may monitor attentiveness level of an operator against a personalized behavior model; personalized behavior model may be generated using machine-learning and/or neural net processes as described above, for instance utilizing operator data collected by attention state module 144 as training data. Attention state module 144 may alternatively or additionally compare attentiveness level to permissible thresholds, which may include thresholds corresponding to duration, frequency, and/or other patterns, compatible with operator attentiveness computed from a driving context. In an embodiment, if a driver is not found to be distracted but shows signs of drowsiness, system may start evaluation of driver attentiveness against user behavioral models and safety margins following the same flow used for distracted driving monitoring. Where driver is not found to be distracted nor drowsy the system may continue to observe the driver's face and hands, and iteratively performing the above steps.

In an embodiment, and still referring to FIG. 1, determining an attentiveness level may include making a risk determination as a function of the at least a driving condition datum, and determining the attentiveness level based on the risk determination. As a non-limiting example, generating attentiveness level 148 and/or making risk determination may be performed, by attention state module 144 may further include calibrating the attentiveness level 148 with historical skills and experiences of the operator using machine learning and calibrating the attentiveness level with historical behaviors of the operator using machine learning. For instance, and without limitation, determination of attentiveness level may be accomplished by extracting, retrieving, and/or collecting a plurality of historical operator data and a plurality of correlated historical driving condition data, for instance and without limitation as described above. Historical driving condition data may include any information of past occurrences as related to at least an operator state datum and at least a historical driving data, respectively, as described above, extracted by attention state module 144. Historical operator data and historical driving condition data may further include extracted features from past behaviors and/or driving skills of an operator. Features may be extracted from past and/or dynamically reported critical information about traffic jams, dangerous intersections, ice patches, car accidents, or the like, for instance as received via data connections to cloud servers or the like. Determination of risk level and/or attentiveness level may further include generating a machine-learning model as a function of the plurality of historical operator data and the plurality of correlated historical driving condition data, using any suitable machine-learning process, and making a risk determination using the machine-learning model and the at least a driving condition datum. For example and without limitation, training data may correlate a combination of operator historical data and historical driving condition data to outcome data including crashes, near-crashes, deviations from lanes, and/or other data indicative of negative outcomes; a supervised machine-learning process may take a combination of driving condition data and operator state data as inputs and generate as output a probability of one or more negative driving outcomes, which probability may indicate a risk level.

Attention state module 144 may use machine-learning processes to generate and/or utilize models and/or training data to generate outputs; machine-learning may, as a non-limiting example, be used to continuously evaluate operator attentiveness level, to continuously evaluate driving risk, to detect and/or predict vehicular collision or crash conditions, or the like. Attention state module 144 may compare estimated attentiveness level 148 exhibited by the operator to an attentiveness level 148 required to handle the estimated risk condition, using without limitation machine-learning, deep learning, and/or neural net processes and/or models as described above. Decisions and/or determinations may alternatively or additionally be based on past performance of the operator, and adjusted for perceived changes of the day, including measures of nervousness, anger, and/or fatigue. Decision and/or determinations may be performed using real time ambient data updates from cloud services, for instance via a phone connection, obtained by system. As a non-limiting illustration, attention state module 144 may perform a risk determination that operator attentiveness level is adequate or better, for the current driving task. Attention state module 144 may perform a risk determination that operator attentiveness level is insufficient to handle the current driving task. Each of these steps may be performed using any suitable component and/or process as described in this disclosure. As a non-limiting example, attention level may be calculated by calculation of an initial attention level, comparison to a risk level determined as described above, and determination of a degree of attention needed to operate vehicle at risk level. This may be performed, without limitation, by receiving training data correlating risk levels and/or sets of historical driving condition data and/or historical operator data as described above, and generating a machine-learning model that outputs attentiveness level, risk level, and outcome probability as described above; attentiveness level may be compared to attentiveness levels associated with a low probability of negative outcomes. For example, attentiveness level may be computed as a percentage of or portion of an attentiveness level associated with a low probability of negative outcome at a risk level matching conditions detected using at least a driving condition sensor and/or at least an operator sensor; percentage and/or proportion may be compared to a threshold level, which may be, as a non-limiting example, 85% of the attentiveness level associated with low probability of negative outcome, where failure to exceed the threshold level prevents generation of an output message as described in further detail below.

With continued reference to FIG. 1, at least a transport communication device 104 of system 100 includes communication with a location interface component 152, the location interface component 152 designed and configured to determine geographical location 156 of the at least a transport communication device 104. Location interface component 152 may include a processor and may be implemented as any computing device as described herein, including without limitation any device suitable for use as at least a transport communication device 104, and/or as any hardware and/or software module incorporated in, operating on, or in communication with such a computing device; location interface component may be any suitable hardware and/or software module incorporated in and/or connected to at least a transport communication device 104. Geographical location 156 may include a location on a map, such as without limitation a current latitude and longitude of at least a transport communication device 104. Location interface component 152 may timestamp and/or include latitude and longitude of any detection within any at least a driving condition datum and/or at least an operator state datum. Location interface component 152 may include a global position system (GPS), a satellite-based radio navigation system which uses a global navigation satellite system (GNSS) to provide geolocation and time information to a GPS receiver anywhere on or near the Earth where there is an unobstructed line of sight to four or more GPS satellites. Location interface component 152 may include a Wi-Fi position system (WPS), a geolocation system that uses the characteristics of nearby Wi-Fi hotspots and other wireless access points to discover where a device is located and may be used where satellite navigation such as GPS is inadequate due to various causes including multipath and signal blockage. Typical parameters useful in WPS to geolocate a wireless access point include SSID and MAC addresses, where accuracy depends on the number of nearby access points whose positions have been entered into a database and where database gets filled by correlating device GPS location data with Wi-Fi MAC addresses.

With continued reference to FIG. 1, at least a transport communication device 104 of system 100 includes a recommender module 160, the recommender module 160 designed and configured to receive at least a local attraction datum 164, generate an output message referencing the at least a location attraction datum as a function of the attentiveness level and the geographical location 156, and provide the output message to the operator. Recommender module 160 may include a processor and may be implemented as any computing device as described herein, including without limitation any device suitable for use as at least a transport communication device 104, and/or as any hardware and/or software module incorporated in, operating on, or in communication with such a computing device. In an embodiment, recommender module 160 provides an output message of at least a local attraction datum 164 to the operator so long as the attentiveness level 148 does not reveal the operator of a vehicle to be inattentive, distracted, or the like; in other words the operator must have enough attentiveness while driving to be able to spare to view such local attraction datum 164. "At least a local attraction datum" 164 as used herein is a datum from a nearby local attraction, hospitality provider, food service provider, sporting venue, theatre, merchant, public park, an insurance company offering automobile insurance or other forms of insurance applicable in the geographical region in which the operator is driving, or the like which is provided as an output message to the operator on the at least a transport communication device 104 when attentiveness level 148 indicates an appropriate time to do so (i.e. when operator is attentive, not distracted, aware of the road, etc.). Output message" referencing the at least a local attraction datum 164 may be generated as a function of attentiveness level 148 and the geographical location 156, and may include a display on the at least a transport communication device 104 of the at least a local attraction datum 164 in the form of textual elements, images, audio, or any other form for which content may be displayed. The output message may include associated cost(s), date(s), location(s) and the like of associated at least a local attraction datum 164. As a non-limiting example, a hotel nearby an operator to a vehicle may have a last minute room open for that night and the next night (2 nights total) that they desire to fill, so an output message of at least a local attraction datum 164 is transmitted to the attentive operator which states the name of the hotel, cost for 2 nights, dates of stay, and location of the hotel, wherein the operator can view the offer on at least a transport communication device 104 and either accept, decline, or ignore such offer.

Local attraction datum may include one or more offers of insurance from one or more insurance carriers or agents. For instance, and without limitation, local attraction datum may include an offer of coverage for automobile insurance, or "car insurance offer." Car insurance offer may include a vehicle to be covered, which may include a vehicle currently being operated by operator and/or a vehicle in which system 100 is currently deployed. Car insurance offer may include a type of coverage, such as liability coverage that pays for damage caused by operator to other vehicles, persons, or the like, collision insurance that pays for damage to operator's vehicle in an accident involving another vehicle, comprehensive insurance covering damage due to vandalism, theft, accidents involving animals, falling objects, fires, explosions, civil commotions and/or riots, weather damage including hail, or the like, uninsured motorist insurance that protects operator and/or operator's vehicle against damage caused by uninsured drivers and/or hit-and-run accidents, underinsured motorist insurance, Medical payments coverage, Personal injury protection insurance, gap insurance, towing and labor insurance, rental reimbursement insurance, classic car insurance, and/or any other insurance plans and/or options that may occur to persons skilled in the art, upon reviewing the entirety of this disclosure. Options and/or attributes of insurance may have availability and/or costs that depend on one or more factors, including without limitation a neighborhood in which operation of a vehicle is taking place and/or in which operator lives or works, gender of an operator, age of an operator, driving history of operator, marital status of operator, profession of operator, grades achieved by operator in an academic institution, value of a vehicle operated by operator, type of a vehicle operated by operator, estimated distance to be traveled, distance previously traveled according to odometer readings or the like, user credit rating, or any other factors or combinations of factors that persons in the art, upon reviewing the entirety of this disclosure, will recognize as applicable to calculation of coverage and/or cost; factors may include any data suitable for use as electronic driving records (EDR), for instance as described in U.S. Nonprovisional application Ser. No. 15/820,411, filed on Nov. 11, 2017, and entitled "METHOD TO ANALYZE ATTENTION MARGIN AND TO PREVENT INATTENTIVE AND UNSAFE DRIVING," the entirety of which is incorporated herein by reference. Offers may include a variable cost and/or coverage offers, wherein costs and/or coverage options may vary according to data received regarding operator, vehicle, and/or trip information, including without limitation updates to EDR as described in U.S. Nonprovisional application Ser. No. 15/820,411. Such variable plans may include a "cents-per-mile system" in which rewards for driving less may be delivered automatically, GPS systems in which costs and/or discounts are calculated based on distances covered by operator as recorded using navigational systems such as GPS or the like, onboard diagnostic (OBD-II) systems where onboard diagnostic data concerning vehicles is used to raise or lower premiums, behavior-based insurance, where user driving behavior, for instance as tracked using EDR as described above, may be used to set and/or modify premiums.

As a non-limiting example a driver who intends to operate a vehicle may request insurance via a mobile app, for instance by requesting a best offer for an insurance policy personalized to a) a selected vehicle, b) a period of time, c) preferred coverage options such as self, additional people, d) maximum coverage limits, deductibles, or the like, d) current and planned geography of the expected driving, e) deadline for the decision to select and sign the policy (specific time of same or different day). System may automatically collect information about Vehicle Identification Number (VIN), and as a result, car make and model, historic data about vehicle conditions, age, market value, repairs, and the like; system may retrieve driver's driving scores (e.g. FICO's driving score, Attention and Responsiveness scores) for insurance carriers to assess the historic propensity to risk-taking. Insurance carriers may be offered richer information on good risk drivers and more room to apply discounts, to attract new customers. Policies may optionally include variable discounts depending on actual driving, attentiveness and responsiveness scores, and be adjusted during the course of the policy, while providing feedback to the driver about actual behavior vs. expected behavior.

With continued reference to FIG. 1, at least a local attraction datum 164 may be transmitted from a local attraction network 168. Local attraction network 168 may include any of those able to provide at least a local attraction datum 164 as described above and referred to herein as an attraction provider. Local attraction network 168 may transmit a plurality of local attraction data to transport communication device 104 representing a plurality of attraction providers. Local attraction network 168 may include at least an attraction provider server which may include any server or computing device as referred to in this disclosure. Local attraction network 168 may include at least an attraction provider database which may include any database or storage device as disclosed in this disclosure. Although only a single local attraction network 168 is depicted, system 100 may be configured to involve multiple local attraction network 168s or various performances within a particular local attraction network 168.

Still referring to FIG. 1, selection of at least a local attraction datum may include performance of an initial set of lazy-learning processes to cover a "first guess" at an at least a local attraction datum 164 associated with an element of an operator, using training data. As a non-limiting example, an initial heuristic may include a ranking of at least a local attraction datum 164 according to relation to an operator preferred attraction type, one or more categories of preferred attraction types, and/or one or more operator preference variables; ranking may include, without limitation, ranking according to significance scores of associations between elements of at least a local attraction datum 164 and operator preference variables. Heuristic may include selecting some number of highest-ranking associations and/or match to an element in operator preference variables. Recommender module 160 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs relating to selection of at least a local attraction datum to be displayed to operator as an output message as described in this disclosure, including without limitation lazy learning applications of machine-learning algorithms as described in further detail herein.

With continued reference to FIG. 1, selection of at least a local attraction datum may be performed using at least an operator preference variable. For instance, and by way of illustration, receiving the at least a local attraction datum 164 may include receiving a plurality of local attraction data and the recommender module 160 is configured to select at least a local attraction datum from the plurality of local attraction data. The plurality of local attraction data may come from a local attraction network 168 as described above. In one non-limiting example, an operator may enter an operator preference variable on the at least a transport communication device 104 indicating an interest in hotel rooms but only those that are 50% off their normal nightly rate; all nearby hotels meeting this one criteria may be displayed to operator. "Operator preference variable" as used herein is a variable describing an attribute of a local attraction datum that matches an operator preference. For example, and without limitation, an operator may enter an operator preference variable indicating the operator is vegetarian and thus only want to be presented vegetarian restaurants; all nearby restaurants which have vegetarian options may be displayed to the operator. Recommender module 160 may be further configured to select a local attraction datum by receiving a plurality of operator preference variables, generating a function of the plurality of local attraction data using the plurality of operator preference variables, and minimizing the loss function. For example, and non-limiting, an operator may enter on an at least a transport communication device 104 that they would only like to be shown hotels that are at least 25% off the regular nightly rate, have complimentary breakfast, and have the best average "star" ratings in the area; where the hotels that are determined to meet all of these criteria the "best" are displayed to the operator, even if some of the preference variables are not met. Continuing the non-limiting example, a hotel that meets all of the operator preference variables here except that the 25% off hotel is 100 miles away may not be displayed when compared to a hotel that is 50% off with a lower start rating. Operator preference variables may include, without limitation, preferences with regard to price and/or cost of goods and/or services, proximity to a location such as a current location of operator, preference with regard to a duration of availability of a good or service, a preference with regard to a time of availability of a good or service— that is, at what time in the future and/or how soon the good or service will be available, a distance from the operator, one or more attributes, plans, or the like for insurance, or any other attributes of offers described above.

Still referring to FIG. 1, a "loss function", as used herein is a mathematical expression of an output of which an optimization algorithm minimizes to generate an optimal result. As a non-limiting example, recommender module may select a local attraction datum, of a plurality of local attraction data, that minimizes a measure of difference from a plurality of operator preference variables; measure of difference may include, without limitation, a measure of geometric divergence between a vector, defined herein as any n-tuple of variables, representing attributes of local attraction data and vectors representing plurality of operator preference variables, such as without limitation cosine similarity, or may include any suitable error function measuring any degree of divergence and/or aggregation of degrees of divergence, between attributes of user heath quality vector and intervention vectors. Selection of different loss functions may result in identification of different interventions as generating minimal outputs. Alternatively or additionally, each of plurality of operator preference variables and each set of attributes of local attraction data may be represented by a mathematical expression having the same form as mathematical expression; recommender module may compare the former to the latter using an error function representing average difference between the two mathematical expressions. Error function may, as a non-limiting example, be calculated using the average difference between coefficients corresponding to each variable. An intervention having a mathematical expression minimizing the error function may be selected, as representing an optimal expression of relative importance of variables to a system or user. In an embodiment, error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of mathematical expression and/or loss function may be scaled and/or normalized; this may permit comparison and/or error function calculation to be performed without skewing by varied absolute quantities of numbers. Recommender module may select a plurality of local attraction data to operator; for instance, ranking may be maintained of local attraction data according to a degree to which they minimize loss function, and a number of highest-ranking local attraction data, such as the ten highest ranking interventions or the like, may be selected.

With continued reference to FIG. 1, more than one loss function and/or lazy learning process may be implemented; for instance, while a first loss function and/or lazy learning process may relate all operator preference variables to at least a local attraction datum 164, a second loss function and/or lazy learning process may select a most efficient driving route, which in turn may be used to score route efficiencies and be input to a more global loss function, for instance by presenting to the more global loss function a list of local attractions with optimal routes. Alternatively or additionally, a current operator may specify one or more operator preference variables according to which that operator wishes a selection function to be performed, eliminating use of other operator preference variables to derive and/or perform selection function. At least a local attraction datum 164 may be received as a function of any of the artificial intelligence, machine-learning, and/or deep learning processes as described herein above.

Further referring to FIG. 1, output message may alternatively or additionally include a warning about predicted interruption of service ahead, which may be generated, without limitation, as a function of identification of an upcoming loss as described above. In some embodiments, and without limitation, at least a transport communication device 104 may use any method described above, including without limitation rates of change of signal strength, outputs of one or more machine-learning models, database records, or the like, to calculate an amount of time, which may be referred to for the purposes of this disclosure as "look-ahead timing" to allow an operator to prioritize tasks and prepare for the interruption; an operator or other user may specify an amount of look-ahead time desired for future potential outages by entering a command configuring at least a transport communication device 104 to output message at least that long before loss of connectivity. Output message may indicate the amount of look-ahead timing to the user.

In an embodiment, and still referring to FIG. 1 recommender module 160 may further include a language processing module 172 configured to provide the output message as a function of operator preferred language. Language processing module 172 may include a processor and may be implemented as any computing device as described herein, including without limitation any device suitable for use as at least a transport communication device 104, and/or as any hardware and/or software module incorporated in, operating on, or in communication with such a computing device. On a basic level, language processing module 172 may perform translation from one language to another by decoding the meaning of a source text and re-encoding this meaning in the target language text. Translation may be of information within an output message that is in one language but that needs to be translated to the preferred language of a vehicle operator. Language processing module 172 may perform simple substitution of words in one language for words in another. Language processing module 172 may also use more complex methods of language translation with a corpus of statistical and neural techniques for more accurate language conversion, handling differences in linguistic typology, translation of idioms, and the isolation of anomalies. Natural language processing (NLP) may be implemented, as described above, and used in combination with artificial intelligence techniques, as described above. Language processing module 172 may be further configured to generate an audial output as a function of the output message. Language processing module 172 may be triggered by the at least a transport communication device 104 indicating operator desires audial representation of the output message. Language processing module 172 may generate prompts to an operator using sound and speech synthesis to drive a speaker array, which may be implemented as any audio output device described herein; microphones, which may include without limitation any audio input devices as described herein, may capture driver's reaction, comments, requests to create actionable text via speech recognition and NLP used by the language processing module 172 to evaluate responsiveness of the driver. When dialog is used to assess interest of operator, language processing module 172 may rely on dialog history, short-term driver information, trip data and/or information about operator's skills to determine type of content, pace, and/or length of the interaction to drive the dialog with the driver. Similar language processing methods to those described above may be applied to translate between language and to provide audio dialogue with an operator, as will be apparent to persons skilled in the art upon reviewing the entirety of this disclosure.

Continuing to refer to FIG. 1, selection of a local attraction datum from at least a local attraction datum may be considered a form of reverse-bidding process. A reverse-bidding process, as used in this disclosure, is a process whereby a person, entity, or device in a position of a recipient or "buyer" of goods or services is provided with various parameter sets by providers of goods or services, including any local attraction data and/or attributes corresponding to operator preference variables as described above, and the buyer and/or a device operated by or acting for the buyer selects one of the parameter sets. This process may be referred to in an embodiment as a "reverse auction." Selection of parameter sets may be performed according to any process and/or process steps for selection from local attraction data. As a non-limiting and exemplary embodiment, where a user has input an instruction requesting insurance coverage and/or specifying operator parameters desired in insurance coverage, an auction may be called and posted online to insurance companies and agencies licensed to serve the intended geographies and interested in participating in online bids; in other words, insurance companies and/or agencies may be provided with information input by and/or concerning operator, which may include without limitation EDR as described above. As responses from carriers, such as insurance companies and/or agencies, come in, complete with offers supporting the requested features and available additional options, operator may be presented with a dashboard and/or other graphical user interface listing and comparing the competing plans offered, and at any time before the specified deadline may decide to stop the auction and select a bidder; alternatively or additionally, system may perform selection as described herein and optionally display one or more selection results to user. This method may also enable short-term insurance plan (e.g. drive of a rented or loaned car for use of a personal car on a race track for the duration of the test drive) when the risk may be higher but only for a short period of time (e.g. crossing, parking in a dangerous area; for instance, user may request insurance upon embarking on a trip into a relatively risky area by asking for more comprehensive coverage and/or coverage for larger damages. User may request coverage for a new jurisdiction while driving to the new jurisdiction, such as when crossing into another country, or the like.

In an embodiment, aspects of selection processes described in this disclosure, including processes implementing reverse-bidding procedures, may act to switch a burden of collecting information about various similar options, such as similar product offerings, service offerings, attraction information, or the like, from the recipient, such as without limitation a buyer, to the providers and/or sellers of the information, offerings, attraction information, or the like. This may be particularly advantageous when the buyer and/or person making a selection does not have a large amount of time to decide. For instance, and by way of illustration when a user is travelling to a place without having a hotel reservation already at hand, when a user is unexpectedly at a place along the way to destination where the user wants to stay for the night, and/or when a user has the option of getting a car and drive in places where the usual insurance does not provide adequate coverage, a user may lack time to perform research to find an ideal fit to the user's criteria; as a result of making providers of information indicating available options matching one or more key requirements presented by a user and/or by system, providers of the information and/or offers in question may use resources the user may not easily have available, while obviating any need the user may have to expend additional effort beyond waiting for information and/or offers to arrive, and making a selection, whether automatically via system 100 and/or by choosing from a plurality of presented options. This relative lack of effort required for user may also minimize danger due to distraction, as information may be provided tersely and efficiently, as well as in manners consistent with user ability to pay attention given risk factors and/or attention level of the user.

As an illustrative example, late in the day hotels may have available rooms, but no easy way to advertise them, with the risk of leaving them unused; use of systems and methods as provided herein may provide a way to adjust factors such as pricing, knowing that the possible buyers on the road are few, but that there may be some interested ones in the area. Users travelling alone or with family late in the day may wish to find an accommodation for the night, in the area they are in or close by, without the risk of having no place to go to. Time may be limited, and typical reservation tools are not designed to address this situation. In transactions enabled by systems and methods as disclosed herein, users can get favorable offers, such as heavily discounted prices, while providers can get last-minute buyers, for instance using heavy, time-limited price bidding to get at least some value for a room otherwise unused.

As a further non-limiting illustration, where offers and/or information pertain to insurance, there may be situations where a user is not aware of special or best-match deals, and providers are not aware of potential buyers needing new coverage and having to decide quickly. The combination of having a driver as a buyer and an application on a mobile device to help collect information about location, time, planned destination, automatically, may minimize an amount of information that the driver needs to specify up front to define the desired product.

Figure 2:
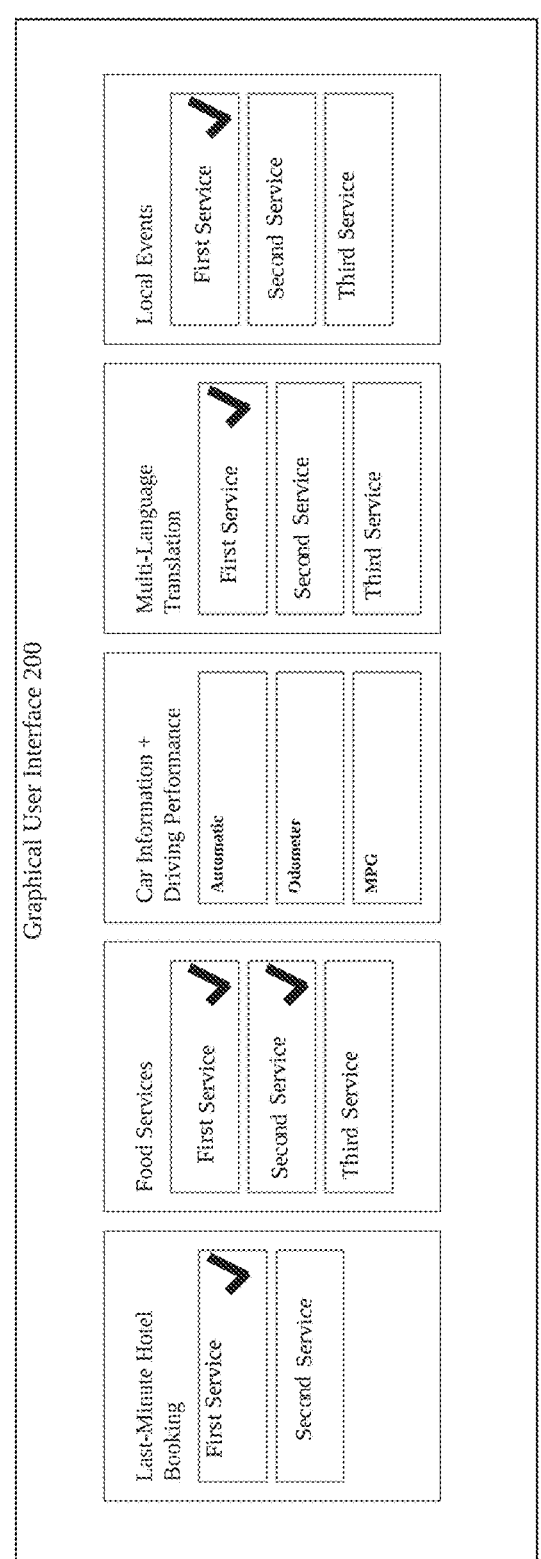
FIG. 2 is a block diagram illustrating an exemplary embodiment of a graphical user interface of at least a transport communication device.

Referring now to FIG. 2, an exemplary embodiment of a graphical user interface 200 of at least a transport communication device 104 is illustrated. At least a transport communication device 104 includes a graphical user interface 200. Graphical user interface 200, which may include without limitation a form or other graphical element having data entry fields, wherein one or more users, may enter information describing one or more user preferences and selections as described herein above. Fields in graphical user interface may provide, for instance in "drop-down" lists, where users may be able to select one or more entries to indicate their preference and/or selections. Fields may include free-form entry fields such as text-entry fields where a user may be able to type or otherwise enter text. As mentioned above, as a non-limiting example, at least a transport communication device 104 may be a portable and/or mobile computing device such as without limitation a smartphone, tablet, laptop, or netbook; at least a transport communication device 104 may include a computing device integrated and/or mounted on or in a vehicle. At least a transport communication device 104 may be connected to a network and including graphical user interface 200 and a processor. At least a transport communication device 104 may be a mobile device operated by a vehicle operator who may be seeking to receive at least a local attraction datum 164 with preferences.

With continued reference to FIG. 2, graphical user interface 200 may display, as a non-limiting exemplary illustration, options for an operator to choose from. For example, operator may choose to only receive "Last-Minute Hotel Booking" offers from a first last-minute hotel booking service, "Food Services" first food service and second food service, "Multi-Language Translation" from the service first translation service, and "Local Events" from First local event service. Options seen in "Car Information+Driving Performance" may provide information related to a vehicle, such as vehicle type, odometer reading, mile per gallon, and other information that may be related to driving conditions. This non-limiting illustration presents at least a local attraction datum 164s that may be presented by entities which compile hospitality, food, translation, and event providers. Another non-limiting example may provider the operator with options to exclude such services and allow operator to filter based on, as non-limiting examples; hotel size, hotel amenities, hotel price, local event type, local event price, restaurant cuisine type, or the like. Translation services may be performed by integrated translation services or performed directly on at least a transport communication device 104 using methods described above in this disclosure.

Referring now to FIG. 3, an exemplary embodiment of an interior portion of a vehicle 304 including a camera module unit 308, such as may be used as part of system 100 in an embodiment, is illustrated. A camera module unit 308 may include an operator-facing camera 140. Operator-facing camera 140 may be mounted to or on any suitable component of vehicle and/or other structural element; for instance and without limitation, operator-facing camera 140 may be mounted on or close to a rearview mirror. A camera module unit 308 may include a processor 312, which may include any device suitable for use as a processing unit as described above, and/or any computing device that may be in communication with such a processing unit; processor 312 may be configured in any way suitable for configuration of a processing unit as described above. Camera module unit 308 may include a road-facing camera 116, which may be housed together with operator-facing camera 140 or may be housed separately; in an embodiment, each of operator-facing camera 140 and road-facing camera 116 may be connected to a dedicated processor, or both may be connected to and/or in communication with the same processor 312. Road-facing camera 116 may be mounted and/or attached to any suitable structure and/or portion of a vehicle; as a non-limiting example, road-facing camera 116 may be attached to a windshield, next to a rearview mirror's mount. Wireless connectivity may provide data transfer between camera module unit 308, operator-facing camera 140, road-facing camera 116, and/or processor 312 and a processing unit such as without limitation a smartphone. More specifically, camera module unit 308 may be mounted next to the rearview mirror (attached to windshield or to body of rearview mirror) to provide best view of an operator's face while minimizing interference with road view. Camera module unit 308 may contains a road-facing camera 116, an operator-facing camera 140 and a processing unit 312 to analyze and process video streams from the two cameras, and to communicate 316 (wirelessly or via USB connection) with a mobile application on a phone 230 or other processing device as described above.

Referring now to FIG. 4, a method of using artificial intelligence to present geographically relevant user-specific recommendations based on vehicle operator attentiveness is illustrated. At step 405, at least a transport communication device 104 communicates with a vehicle. This may be implemented, for instance, as described above in reference to FIGS. 1-3. At step 410, at least a transport communication device 104 uses at least a driving condition sensor 108 to monitor driving conditions, wherein at least a driving condition datum is generated. This may be implemented, for instance, as described above in reference to FIGS. 1-3. Monitoring driving conditions may further include capturing a video feed of conditions external to the vehicle. This may be implemented, for instance, as described above in reference to FIGS. 1-3. Capturing a video feed of conditions external to the vehicle may further include detecting external objects and generating at least a driving condition datum as a function of detected external objects. This may be implemented, for instance, as described above in reference to FIGS. 1-3 . . . above in reference to FIGS. 1-3.

At step 415, and still referring to FIG. 4, at least a transport communication device 104 uses at least an operator sensor 124 to monitor an operator of a vehicle, wherein at least an operator state datum is generated. This may be implemented, for instance, as described above in reference to FIGS. 1-3. Monitoring an operator may further include capturing a video feed of the operator. This may be implemented, for instance, as described above in reference to FIGS. 1-3. Capturing the video feed of the operator may further include detecting operator face contours and generating at least an operator state datum as a function of the detected operator face contours. This may be implemented, for instance, as described above in reference to FIGS. 1-3. Monitoring the operator of a vehicle may further include generating at least an operator state datum by determining a direction of operator focus. This may be implemented, for instance, as described above in reference to FIGS. 1-3.

At step 420, and still referring to FIG. 4, at least a transport communication device 104 uses an attention state module 144 to generate an attentiveness level as a function of the at least a driving condition datum and the at least an operator state datum. This may be implemented, for instance, as described above in reference to FIGS. 1-3. Generating the attentiveness level may further include extracting historical operator data and historical driving condition data, generating a machine-learning model as a function of the historical operator data and the historical driving condition data, and making a risk determination using the machine-learning model. This may be implemented, for instance, as described above in reference to FIGS. 1-3. At step 425, at least a transport communication device 104 uses a location interface component 152 to determine geographical location 156. This may be implemented, for instance, as described above in reference to FIGS. 1-3.

At step 430, attentiveness level is assessed for either exceeding the criteria that decides a vehicle operator is attentive and can interact with at least an output message referencing a local attraction datum 164 (i.e. move onto step 435), or by failing this criteria wherein monitoring of mentioned conditions continues with no operator receipt of the output message. This may be implemented, for instance, as described above in reference to FIGS. 1-3.

At step 435, and still referring to FIG. 4, at least a transport communication device uses a recommender module 160 to receive at least a local attraction datum 164, wherein at least an output message referencing the at least a local attraction datum is generated as a function of the attentiveness level and the geographical location, and the output message is provided to the operator. This may be implemented, for instance, as described above in reference to FIGS. 1-3. Receiving the at least a local attraction datum 164 may further include making a selection from the at least a local attraction datum by receiving a plurality of operator preference variables, generating a loss function of the plurality of local attraction data using the plurality of operator preference variables, and minimizing the loss function. This may be implemented, for instance, as described above in reference to FIGS. 1-3. Providing the output message to the operator may further include generating the output message as a function of operator preferred language. This may be implemented, for instance, as described above in reference to FIGS. 1-3. Receiving the at least a local attraction datum may further include receiving a plurality of local attraction data and selecting at least a local attraction datum from the plurality of local attraction data . . . above in reference to FIGS. 1-3 . . . above in reference to FIGS. 1-3. This may be implemented, for instance, as described above in reference to FIGS. 1-3.

In an embodiment, and still referring to FIG. 4, system 100 may transmit one or more elements of data, including without limitation any elements of data usable to recalculate costs and/or coverage of automobile insurance plans as described above, to an insurance company selected by system and/or operator. This may include, without limitation, any data concerning operator, vehicle, or the like as described above and/or as usable to determine coverage levels and/or prices as described above. Transmission of data may include transmission of EDR as described in U.S. Nonprovisional application Ser. No. 15/820,411, or any method and/or mode of transmission suitable for such transmission of EDR as described in that application.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
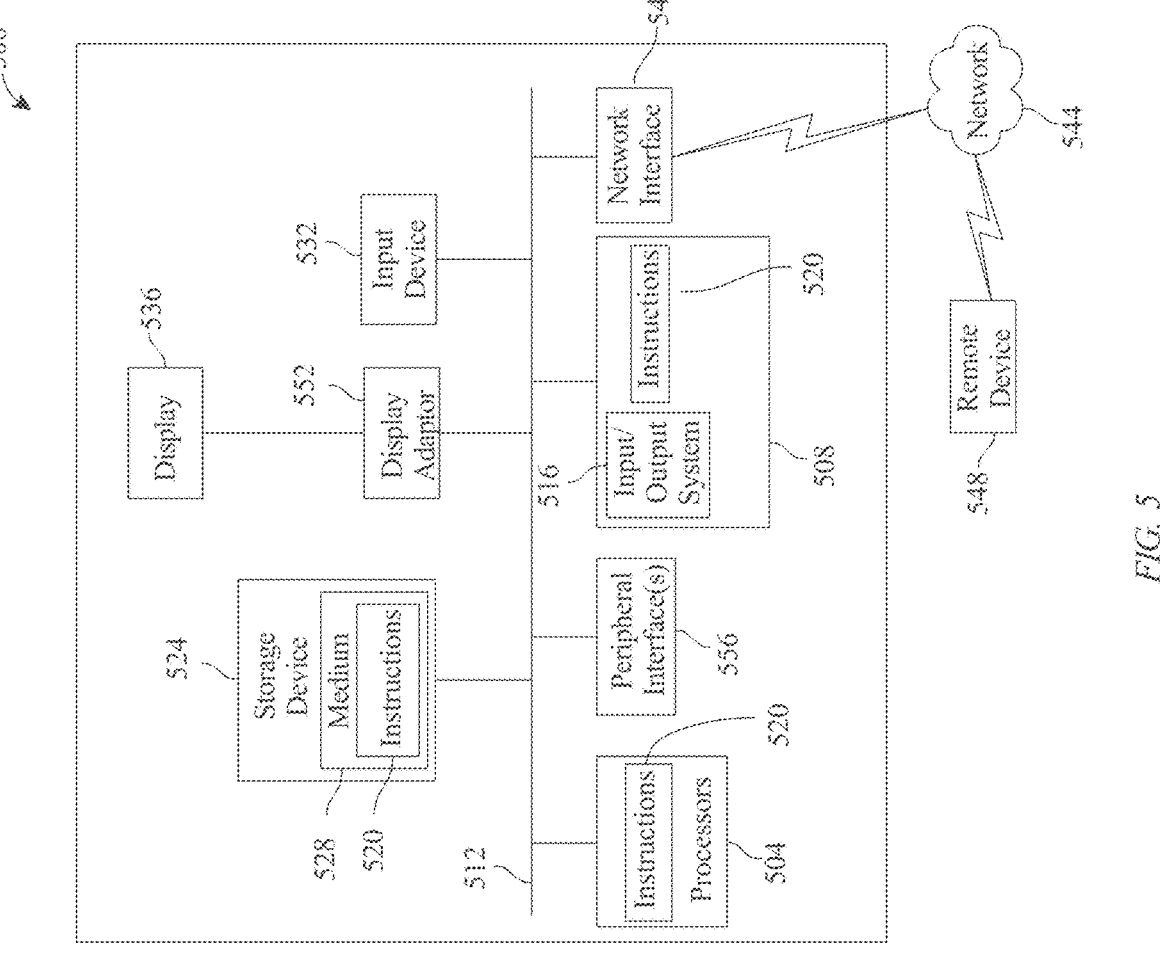
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIRE-WIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for using artificial intelligence to present geographically relevant user-specific recommendations based on vehicle operator attentiveness, the system comprising:

at least a driving condition sensor, the at least a driving condition sensor designed and configured to:

monitor driving conditions; and generate at least a driving condition datum wherein the at least a driving condition sensor comprises at least a road-facing camera configured to capture a video feed of conditions external to a vehicle wherein capturing the video feed further comprises:

detecting external objects by comparing a plurality of video feed frames and determining that a number of pixels exceeding a threshold has changed with respect to vehicle dynamics parameters, including at least positioning in a lane, wherein a frequency of a sample rate of the plurality of video feed frames is selected using a machine leaning model; and generating at least a driving condition datum as a function of detected external objects;

at least an operator sensor, the at least an operator sensor designed and configured to:

monitor an operator of the vehicle; and generate at least an operator state datum; and at least a transport communication device installed in the vehicle and communicatively connected to the at least a driving condition sensor and the at least an operator sensor, the at least a transport communication device configured to:

determine an attentiveness level as a function of the at least a driving condition datum and the at least an operator state datum;

identify an upcoming loss in network connectivity;

generate an output message as a function of the attentiveness level and the upcoming loss in network connectivity;

determine that the operator is attentive based on the attentiveness level exceeding a threshold level; and provide the output message to the operator based on the determination that the operator is attentive using a language processing module configured to generate an audial output as a function of the output message based on user information related to operator skills to determine content and a pace of dialog of the audial output.

2. The system of claim 1, wherein the at least an operator sensor further comprises at least an operator-facing camera configured to capture a video feed of the operator.

3. The system of claim 2, wherein capturing the video feed of the operator further comprises:

detecting operator face contours; and generating at least an operator state datum as a function of the detected operator face contours.

4. The system of claim 1, wherein the at least an operator sensor is further configured to generate the at least an operator state datum by determining a direction of operator focus.

5. The system of claim 1, wherein the output message includes a warning about predicted interruption of service ahead.

6. The system of claim 5, wherein the output message includes an amount of look-ahead timing to the user.

7. The system of claim 1, wherein identifying the upcoming loss of communications further comprises identifying the upcoming loss of communications as a function of a plurality of historical connection data.

8. The system of claim 1, wherein determining the attentiveness level further comprises:

determining a direction of operator focus; and generating an attentiveness level using the direction of operator focus.

9. A method of using artificial intelligence to present geographically relevant user-specific recommendations based on vehicle operator attentiveness, the method comprising:

receiving, by at least a transportation communication device:

at least a driving condition datum from at least a driving condition sensor wherein the at least a driving condition sensor comprises at least a road-facing camera configured to capture a video feed of conditions external to a vehicle wherein capturing the video feed further comprises:

detecting external objects by comparing a plurality of video feed frames and determining that a number of pixels exceeding a threshold has changed with respect to vehicle dynamics parameters, including at least positioning in a lane, wherein a frequency of a sample rate of the plurality of video feed frames is selected using a machine leaning model; and generating at least a driving condition datum as a function of detected external objects; and at least an operator state datum from at least an operator sensor;

determining, by the at least a transportation communication device, an attentiveness level as a function of the at least a driving condition datum and the at least an operator state datum;

identifying, by the at least a transportation communication device, an upcoming loss in network connectivity;

generating, by the at least a transportation communication device, an output message r as a function of the attentiveness level and the upcoming loss in network connectivity;

determining, by the at least a transportation communication device, that the operator is attentive based on the attentiveness level exceeding a threshold level; and providing, by the at least a transportation communication device, the output message to the operator based on the determination that the operator is attentive using a language processing module configured to generate an audial output as a function of the output message based on user information related to operator skills to determine content and a pace of dialog of the audial output.

10. The method of claim 9, wherein the at least an operator sensor further comprises at least an operator-facing camera configured to capture a video feed of the operator.

11. The method of claim 10, wherein capturing the video feed of the operator further comprises:

detecting operator face contours; and generating at least an operator state datum as a function of the detected operator face contours.

12. The method of claim 9, wherein the at least an operator sensor is further configured to generate the at least an operator state datum by determining a direction of operator focus.

13. The method of claim 9, wherein the output message includes a warning about predicted interruption of service ahead.

14. The method of claim 13, wherein the output message includes an amount of look-ahead timing to the user.

15. The method of claim 9, wherein identifying the upcoming loss of communications further comprises identifying the upcoming loss of communications as a function of a plurality of historical connection data.

16. The method of claim 9, wherein determining the attentiveness level further comprises:

determining a direction of operator focus; and generating an attentiveness level using the direction of operator focus.

* * * * *